(12) United States Patent
Gurumoorthy et al.

(10) Patent No.: US 11,556,945 B1
(45) Date of Patent: Jan. 17, 2023

(54) SCALABLE PRODUCT INFLUENCE PREDICTION USING FEATURE SMOOTHING

(71) Applicant: Amazon Technologies, Inc., Seattle, WA (US)

(72) Inventors: Karthik Sundaresan Gurumoorthy, Seattle, WA (US); Vineet Shashikant Chaoji, Bangalore (IN); Dinesh Mandalapu, Seattle, WA (US); Rajeev Ramnarain Rastogi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 894 days.

(21) Appl. No.: 15/714,816

(22) Filed: Sep. 25, 2017

(51) Int. Cl.
*G06Q 30/02* (2012.01)
*G06Q 10/06* (2012.01)

(52) U.S. Cl.
CPC ....... *G06Q 30/0202* (2013.01); *G06Q 10/067* (2013.01)

(58) Field of Classification Search
CPC ............... G06Q 30/02; G06Q 30/0631; G06Q 30/0202; G06Q 10/067
See application file for complete search history.

(56) References Cited

U.S. PATENT DOCUMENTS

| | | | | |
|---|---|---|---|---|
| 2014/0222506 | A1* | 8/2014 | Frazer | G06Q 30/02 705/7.29 |
| 2014/0344453 | A1* | 11/2014 | Varney | H04L 65/4084 709/224 |
| 2016/0170996 | A1* | 6/2016 | Frank | G06F 16/24578 707/748 |
| 2017/0330123 | A1* | 11/2017 | Deshpande | G06Q 10/0837 |

OTHER PUBLICATIONS

Linden, Greg et al: Amazon.com Recommendations: Item to Item Collaborative Filtering Available at: https://www.cs.umd.edu/~samir/498/Amazon-Recommendations.pdf (Year: 2003).*

(Continued)

*Primary Examiner* — Katherine Kolosowski-Gager
(74) *Attorney, Agent, or Firm* — Robert C. Kowert; Kowert, Hood, Munyon, Rankin & Goetzel, P.C.

(57) ABSTRACT

Systems and methods are disclosed to implement an item metric prediction system that predicts a metric for an item using a feature-based model built using other similar items. In embodiments, the system is used to predict item influence values (IIVs) of items indicating an expected amount of subsequent transactions that is caused by an initial transaction of the items. In embodiments, a sample of item transaction data is distributed to a plurality of task nodes, which execute in parallel to determine the items' observed IIVs from the transaction data. Subsequently, a new IIV is determined for an item whose observed IIV has a low confidence level. A set of similar items is selected, and a set of parameters of a feature-based model are tuned to fit the model to the observed IIVs of the similar items. A new IIV having a high confidence level is then obtained using the model.

20 Claims, 12 Drawing Sheets

(56) References Cited

OTHER PUBLICATIONS

Peter C. Austin, "An Introduction to Propensity Score Methods for Reducing the Effect of Confounding In Observational Studies", Multivariate behavioral research, 2011, Retrieved from URL: http://www.tandfonline.com/action/journalInformation?journalCode=hmbr20, pp. 399-424.

Heejung Bang, et al., "Doubly Robust Estimation in Missing Data and Causal Inference Models", Biometrics 61, Dec. 2005, pp. 962-972.

Paul R. Rosenbaum, et al., "Reducing Bias in Observational Studies Using Subclassification on the Propensity Score", Journal of the American Statistical Association, vol. 79, No. 387, Sep. 1984, pp. 516-524.

Yihua Chen, et al., "EM Demystified: An Expectation-Maximization Tutorial", UW Electrical Engineering, UWEE Technical Report, Feb. 2010, pp. 1-16.

\* cited by examiner

| user propensity score group 390 | average follow-on transactions in treatment set 392 | average follow-on transactions in control set 394 | difference (IIV) by quartile 396 |
|---|---|---|---|
| I | $250 | $190 | $60 |
| II | $250 | $180 | $70 |
| III | $50 | $10 | $40 |
| IV | $50 | $0 | $50 | observed IIV of item 398     $55.00

| item 510 | observed IIV 512 | sample size 514 | confidence interval 516 |
|---|---|---|---|
| laptop (brand A) | $52.40 | 3258 | $47.12 – $58.64 |
| e-reader (brand B) | $40.31 | 12 | -$904.33 – $1032.92 |
| game console (brand C) | $71.30 | 39019 | $70.78 – $72.10 |
| printer (brand A) | $14.59 | 6954 | $11.14 – $18.25 |
| toaster (brand D) | $0.33 | 3490 | -$4.46 – $6.82 | large confidence interval 518

*FIG. 5A*

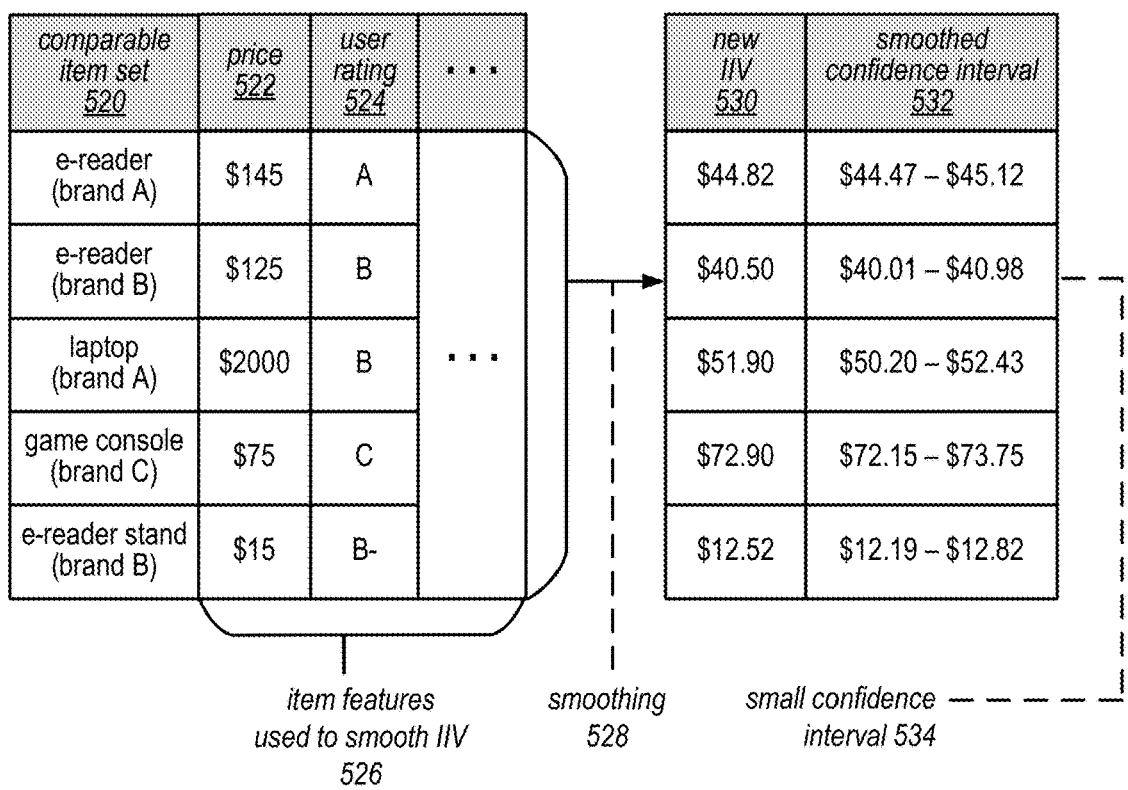

| comparable item set 520 | price 522 | user rating 524 | ... | new IIV 530 | smoothed confidence interval 532 |
|---|---|---|---|---|---|
| e-reader (brand A) | $145 | A | | $44.82 | $44.47 – $45.12 |
| e-reader (brand B) | $125 | B | | $40.50 | $40.01 – $40.98 |
| laptop (brand A) | $2000 | B | | $51.90 | $50.20 – $52.43 |
| game console (brand C) | $75 | C | | $72.90 | $72.15 – $73.75 |
| e-reader stand (brand B) | $15 | B- | | $12.52 | $12.19 – $12.82 | item features used to smooth IIV 526 smoothing 528 small confidence interval 534

*FIG. 5B*

SCALABLE PRODUCT INFLUENCE PREDICTION USING FEATURE SMOOTHING

BACKGROUND

Increasingly, companies are performing large-scale statistical analysis on quantitative data collected in different types of contexts. For example, large-scale transaction systems have become common in recent years. A company may implement a distributed system using web servers and application servers to conduct transactions for goods and services over the world wide web. Consumers may visit the company's website to view and/or transact in goods and services offered by the company or third-party companies. The company may collect transaction data for its goods and services, and perform statistical analysis on such data to predict various metrics for the items.

In some cases, for example, a user's purchase of one item may influence the user's later purchasing behavior. For example, an initial transaction of an e-reader may lead to subsequent transactions of e-books, accessories, etc. Insights into the influence of certain items to user behavior can be valuable to a company. For example, such information can be leveraged in a number of domains such as marketing, recommendations, and inventory planning. However, conventional approaches to the gathering and developing such information are not generally practicable given the state of technology. In some settings, calculations may need to be performed on a randomly sampled universe of millions of users, across millions of items. The types of algorithms needed to train and use the prediction models in this context are computationally expensive, and not scalable to the size of real-world systems. At the same time, some prediction results are difficult to obtain because the size of the observation data is too small. For example, when a new item has only been involved in a handful of transactions, item metrics predictions generated from these few observations are not likely to be very meaningful. Better ways of generating item metrics predictions from different types of item statistics are needed.

BRIEF DESCRIPTION OF THE DRAWINGS

FIGS. 5A and 5B illustrate example stages in a feature smoothing process to reduce the confidence interval of observed item influence values, according to some embodiments.

Figure 1:
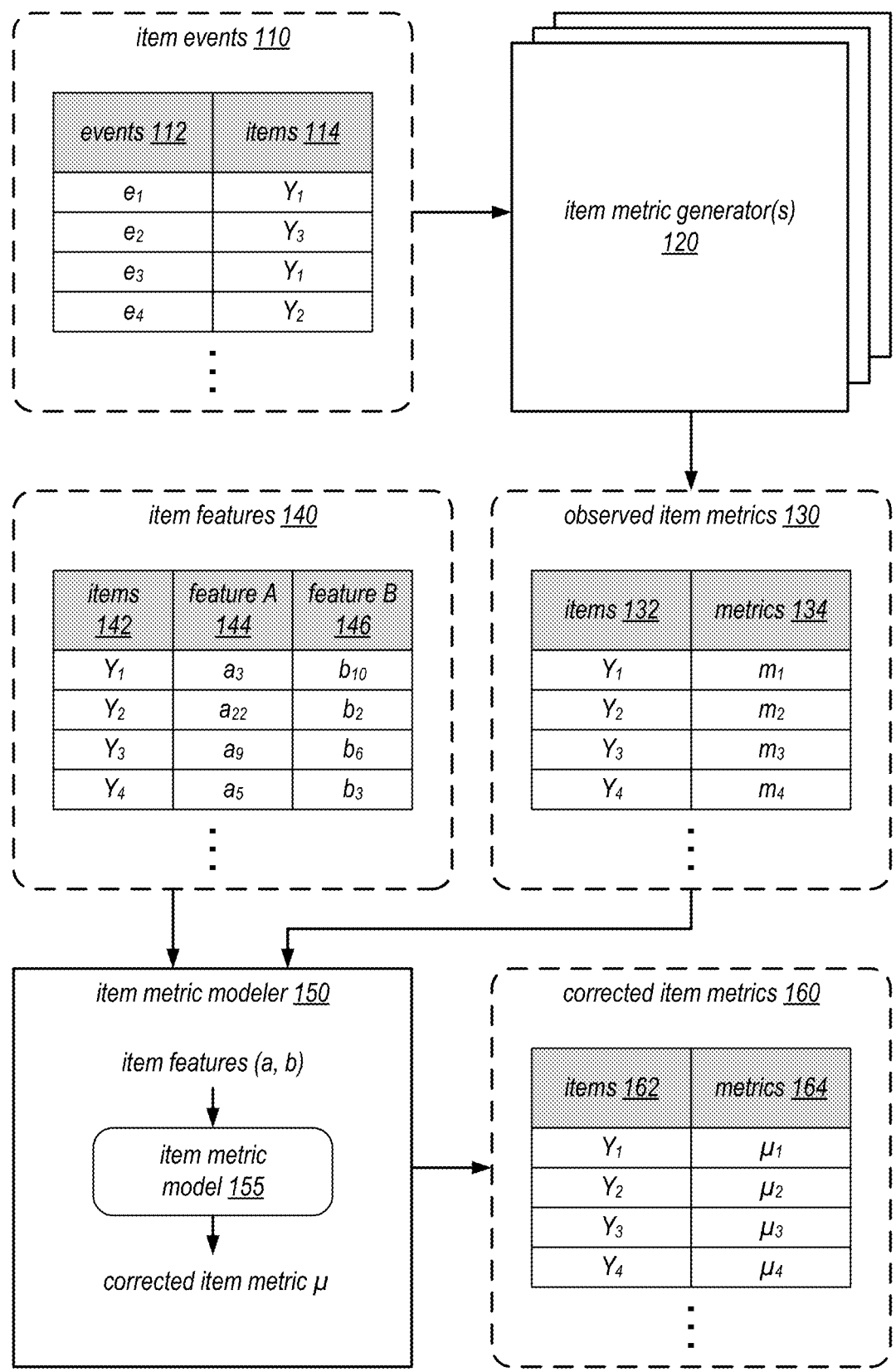
FIG. 1 is a diagram illustrating components and operations of an example item metric prediction system that determines item metrics using feature smoothing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement an item metric prediction system that determines item metric values for items. In some embodiments, the item metrics may comprise item influence values (IIVs), which may be determined to reflect the impact of a purchased item on the future purchasing behavior of users. In embodiments, where the variance or confidence interval of an observed metric for an item is unacceptably large, the system may employ a feature smoothing technique to determine a "smoothed" metric value based on a larger set of items and the items' features. Because the new metric value is obtained from the observed data of multiple items, the resulting value will have a smaller variance and a higher confidence level.

In some embodiments of an item transaction system, users of the system may make transactions of different items over time. Once an item is purchased for a first time by a user, that transaction may predict a subsequent amount of expenditures by the same user within a time window (e.g., one year), measured in terms of dollar value. The long-term impact that initial transaction on the future spending patterns of users may be calculated using machine-learned prediction models. However, the scale of such calculations renders most machine models infeasible. For example, for certain systems, the calculation may involve a large data sampling universe of millions of users, across millions of items. The types of algorithms needed to train and use these models are computationally expensive, and not scalable to the size of real-world systems. At the same time, some prediction results are difficult to obtain because the size of the observation data is too small. For example, when a new item has only been involved in a handful of transactions, any item metric predictions generated from these few observations are not likely to be very meaningful.

Accordingly, embodiments of an item metric prediction system are described herein to determine various types of item metrics for items, based on captured event data associated with the items. In some embodiments, an item influence value (IIV) may be captured for an item, which may indicate an expected amount of subsequent transactions that will be likely caused by the initial transaction of a given item, by a user. To determine the IIV, the system may collect transaction data from different users of different items in an e-commerce system. A sample of the transaction data may be selected, for example, using a pseudorandom selection technique. The selected sample may be used as the working "universe" of data to generate IIVs. In some embodiments, the selected sample may be distributed to a number of task nodes in the item influence prediction system, so that each task not may use the sample to determine individual IIVs for individual items in parallel. In some embodiments, the selected sample may be different for different task nodes. The selected sample may be sized so that it can fit within the operating memory of each task node in the system. In this manner, all of the work associated with the determination of each item IIV may be carried out on a single task node, so that the prediction system can scale with a large number of items.

In some embodiments, the IIV may be determined based on observed events, where each event indicates a segment of the transaction history of a user. In some embodiments, all events may correspond to the same time period. The IIV determination process may extract from the sample of transaction data a treatment set and a control set, where the treatment set include observed events where an initial transaction of a given item was made before a time window, and the control set include events where such an initial transaction was node made. The system may then compare the amount of subsequent transactions in the time window for the treatment set and the control set, to determine a difference between the two types of events. In some embodiments, the IIV determination process may employ a subclassification (SC) technique, where the sample data is classified into stratums, or groups, based on a propensity score of a user that generated each event. In particular, the propensity score of the user may indicate a user's propensity to make the initial transaction based on the user's attributes. Thus, the process may compare users with similar propensity scores during the comparison step. In some embodiments, comparisons may be made for users in each stratum or group, and the results of the comparisons may be averaged to generate an overall observed IIV for the item.

In some embodiments, the system may detect that some observed item metrics, for example IIVs for a new item that have relatively few observed events, have unacceptably large variances or confidence intervals. For these items, the system may perform an additional smoothing process using a smoothing technique to reduce the metric's variance or confidence interval. In some embodiments, a set of comparable items is selected for the particular item with the high-variance observed metric. The system may then determine a feature-based model to determine the metric of all items in the comparable item set, based on the respective features of these items. For example, the system may use a model where a subset of features in the items are combined using in a linear function using a set of feature weights. The system may then tune or adjust the weights to fit or approximate each item's observed metrics. When the model has been sufficiently fitted, a new value for the metric may be determined using the resulting model (e.g., the determined feature weights). The new item metric, or "smoothed" metric, may be slightly different from the observed metric, as it is determined based on a model built based on the observed metrics of multiple items. However, because multiple items are used, the new metric will have a smaller variance, and a higher confidence level. Accordingly, such a process may be used to generate meaningful metrics for items that have small amounts of observed events specific to those items. The smoothing technique may use a machine-driven process to iteratively make better estimates for the parameters of the feature-based model. For example, in some embodiments, an Expectation Maximization technique may be used. In some embodiments, a stochastic gradient descent technique may be used to iteratively update the model parameters. Accordingly, the system may automatically and programmatically smooth certain item metrics to reduce their variance and confidence intervals, making these item metrics more reliable and usable.

In the context of item influence values, the IIVs may be used in a variety of contexts. For example, an item transaction service may determine from the IIV of an item that that item predicts a large amount of subsequent transactions of a particular category of items. As one example, an item transaction service may determine that a cookbook has a high influence on transactions of kitchenware within a three-month period after the transaction of the cookbook. Thus, the system may direct programmatic marketing for kitchenware items to users who have recently purchased the cookbook. In some cases, the system may programmatically make item recommendations based on this detected influence. For example, the item transaction service may programmatically generate coupons, ads, or recommendations for kitchenware items to users who are detected to have recently purchased the cookbook. In some embodiments, the item transaction service may use the IIV value to make inventory planning decisions. For example, in the cookbook example, in response to a high level of sales of the cookbook, the item transaction service may automatically examine its inventory level of kitchenware items, in anticipation of the expected subsequent transactions that may be generated by the cookbook. The system may then adjust inventory levels and/or prices of kitchenware items accordingly.

In other contexts, other types of item metrics may be generated using embodiments of the item metric prediction system and process, as disclosed herein. For example, in one embodiment of an item metric prediction system, the life expectancy of a car may be predicted based various relevant events. For a car that only has a small sample of relevant events, the smoothing technique may be used to predict the metric based on a feature-based model and the features and life-expectancies of similar cars. In another embodiment, an item metric prediction system may be used to predict a probability of a type of disease in a patient, based on a number of different events or risk factors, even if the particular patient has little medical history. In another embodiment, an item metric prediction system may be used to predict one or more weather conditions (e.g., rainfall, temperature, etc.) of a location, even though little actual data has been collected for that location. As may be appreciated by those skilled in the art, the systems and techniques disclosed herein may be used in a variety of applications, and deployed in a variety of implementations. These implementation details and other features and benefits of the item metric prediction system are described in further detail below, in connection with the disclosed embodiments and the figures.

Figure 10:
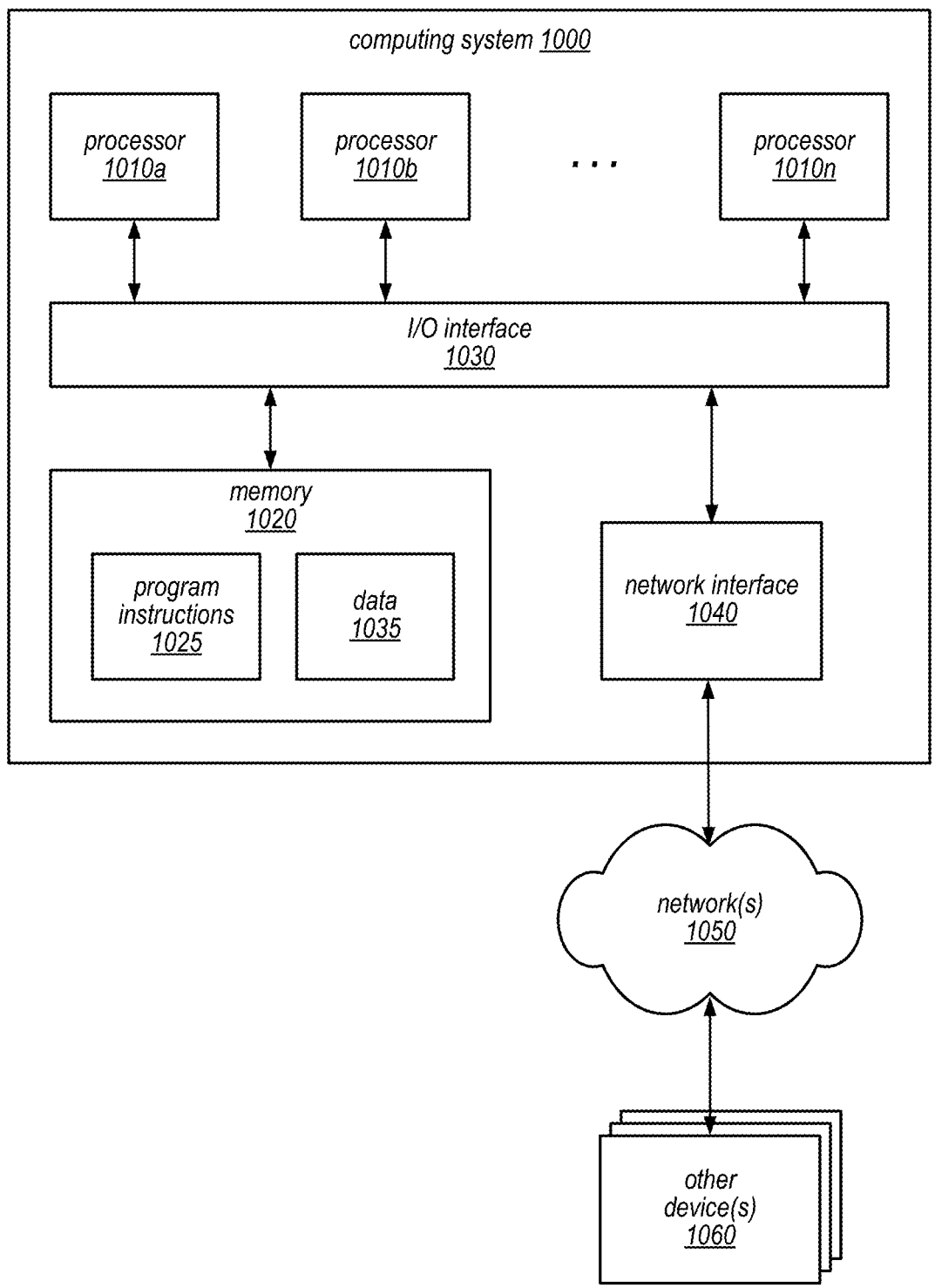
FIG. 10 is a block diagram illustrating an example computer system that can be used to implement one or more portions of an item metric prediction system that determines item metric values using feature smoothing, according to some embodiments.

FIG. 1 is a diagram illustrating components and operations of an example item metric prediction system that determines item metrics using feature smoothing, according to some embodiments. As shown, the figure depicts two computer systems, item metric generator(s) 120 and item metric modeler 150. The item metric generator 120 may be used to perform an initial determination of an item metric for items, based on observed data. The item metric modeler 150 may then perform an additional determination of the item metric for certain item that have a low confidence level, to generate a corrected or smoothed value of the item metric. In some embodiments, the two computer systems may be implemented as a single computer system (e.g., a single cluster or computer network). In some embodiments, computer systems 120 and 150 may be implemented using a computer system as illustrated in FIG. 10.

As shown, in some embodiments, item events 110 may be collected for different items. Each observed event 112 may be associated with a particular item 114. The events 112 may be stored in a data store which may be accessed by the item metric generator 120 to make initial determinations of the item metric. For example, in some embodiments, the items 114 may comprise products that are listed on an e-commerce website, and the events 112 may comprise purchasing histories of a group of users over a particular period of time. In this case, the events 112 may be used to determine an item influence value or score for each item, which reflects the impact of the purchasing of a particular item on a user's subsequent purchasing behavior. In some embodiments, the events 112 may comprise previous weather data, and the items 114 may comprise different days of a month. Using weather events from past days, item metrics (e.g., weather data) for future days may be predicted. In some embodiments, the events 112 may comprise a student's previous test scores, and the items 114 may comprise different students. The test scores may be used to predict for example a student's performance on later tests. As may be understood by those skilled in the art, these particular embodiments are mere examples, as the item metric prediction system and method discussed herein may be used to make a variety of different predictions.

In some embodiments, the item metric generator(s) 120 may comprise a cluster of compute nodes that may be configured to work in parallel to generate metrics predictions for a large number of items based on a large number of events. For example, in some embodiments, item influence values may be generated for hundreds of thousands of products using millions of product transactions. In some embodiments, the individual generator(s) 120 may be implemented as separate threads or processes. In some embodiments, the generator(s) 120 may run on separate virtual machine instances hosted on one or more virtual machine hosts. Because the item metric generators 120 are allowed to run in parallel, the system is made scalable with large numbers of items and/or events.

As shown, in some embodiments, the item metric generators 120 may output observed item metrics 130. The item metrics 130 may include respective metrics 134 for each item 132. The item metric 134 may be a variety of different metrics that are determined from the observed events. For example, in some embodiments, the item metric 134 may be an item's IIV, as discussed. In some embodiments, the item metric 134 may be a patient's risk of a disease, a student's future test performance, or predicted weather data for a future time period, as just some examples. In some embodiments, the observed item metrics 130 may be stored in a data store that is accessible to the item metric modeler 150. As discussed, in some cases, some of the observed item metrics 130 may have a high variance of low confidence level. This may occur for example when an item metric 134 is computed from a small sample of event data 112. In some cases, a high variance or low confidence level may be the result of erroneous or high-noise sample data. In some embodiments, these problematic observed item metrics 130 may be detected by the system, and then recomputed or corrected, to generate new or corrected item metrics 160. In some embodiments, the metrics prediction system may select particular item metrics 130 to correct, based on one or more statistical metrics of the observed item metric 130, such as for example, the observed metric's variance, confidence interval, etc. In some embodiments, all observe item metrics 130 may be recomputed or corrected.

As shown, in some embodiments, an item metric modeler 150 may be used to generate the corrected item metrics 160. The item metric modeler 150 may be implemented using one or more computers, such as for example the computer system shown in FIG. 10. In some embodiments, the item metric modeler 150 may be implemented on multiple compute nodes, which may be networked together or implemented as a cluster, in a similar fashion as the item metric generators 120. Accordingly, individual item metric modelers 150 may be configured to generate the corrected item metrics 160 in parallel. Such parallelism makes the item metric modeler 150 more available and more scalable.

As shown, in some embodiments, the item metric modeler 150 may receive as input item features 140, which may include different features (e.g., feature A 144 and feature B 146) for the different items 142. In some embodiments, the features may be used to build a feature-based model, such as the item metric model 155, to predict the correct item metric 160 for an item based on the item's features. For example, in some embodiments, an item's influence score IIV may be modeled based on a set of the item's features, such as an item type, name, brand, price, etc. In another example, a student's characteristics (e.g., grade level, class attendance record, hobbies, etc.) may be used to model a student's future test performance. As yet another example, certain features or characteristics of a car (e.g., make and model, usage level, geographic location, etc.) may be used to model its life expectancy. In some embodiments, the item features 140 may be stored in a data store that is accessible by the item metric modeler 150.

As shown, the item metric modeler 150 may build and tune an item metric model 155, which takes an item's features as input, and outputs a corrected item metric 160 for that item. In some embodiments, the item metric model 155 may be turned using a machine learning technique, which trains the model to minimize a loss function to accurately predict the item's observed metric value 130. In some embodiments, the item metric model 155 may comprise a function that implements a linear combination of the features using a set of feature weights. During the tuning of the model 155, the linear weights may be updated to accurately predict the items' observed item metrics values 130. In some embodiments, to tune the model 155, a set of similar items may be selected to tune the model. The selection may be performed using one or more similarity criteria. For example, in some embodiments, a set of "similar" items for a given item may include all items having one or more common features (e.g., category, brand, etc.) as the given item. In some embodiments, the model parameters may be tuned in an iterative manner. For example, in some embodiments, the model parameters may be adjusted using an Expectation Maximization technique to maximize an expected likelihood of the observed item metrics of the similar items given the model parameters. In some embodiments, the model parameters may be updated using a stochastic gradient descent technique. In some embodiments, a regularization parameter or term may be employed during the model tuning process, to inject some degree of noise in the training data. The regularization technique may be used to avoid overfitting of the item metric model 155.

After the model 155 is tuned so that the model accurately predicts the items' observed metrics 130 based on their respective features, the prediction may be use to generate corrected item metrics 160 for other items. The predictions may be made based on only the items' features, and not based on the actual observed events 112 associated with the items. As may be understood, because the model 155 is tuned using multiple items and a larger sample of data, the corrected item metrics 160 generated from the model will be associated with a smaller variance and higher confidence level. Accordingly, the technique may be employed to predict corrected item metrics 160 for items whose observed item metrics 130 are associated with a low confidence level.

Figure 2A:
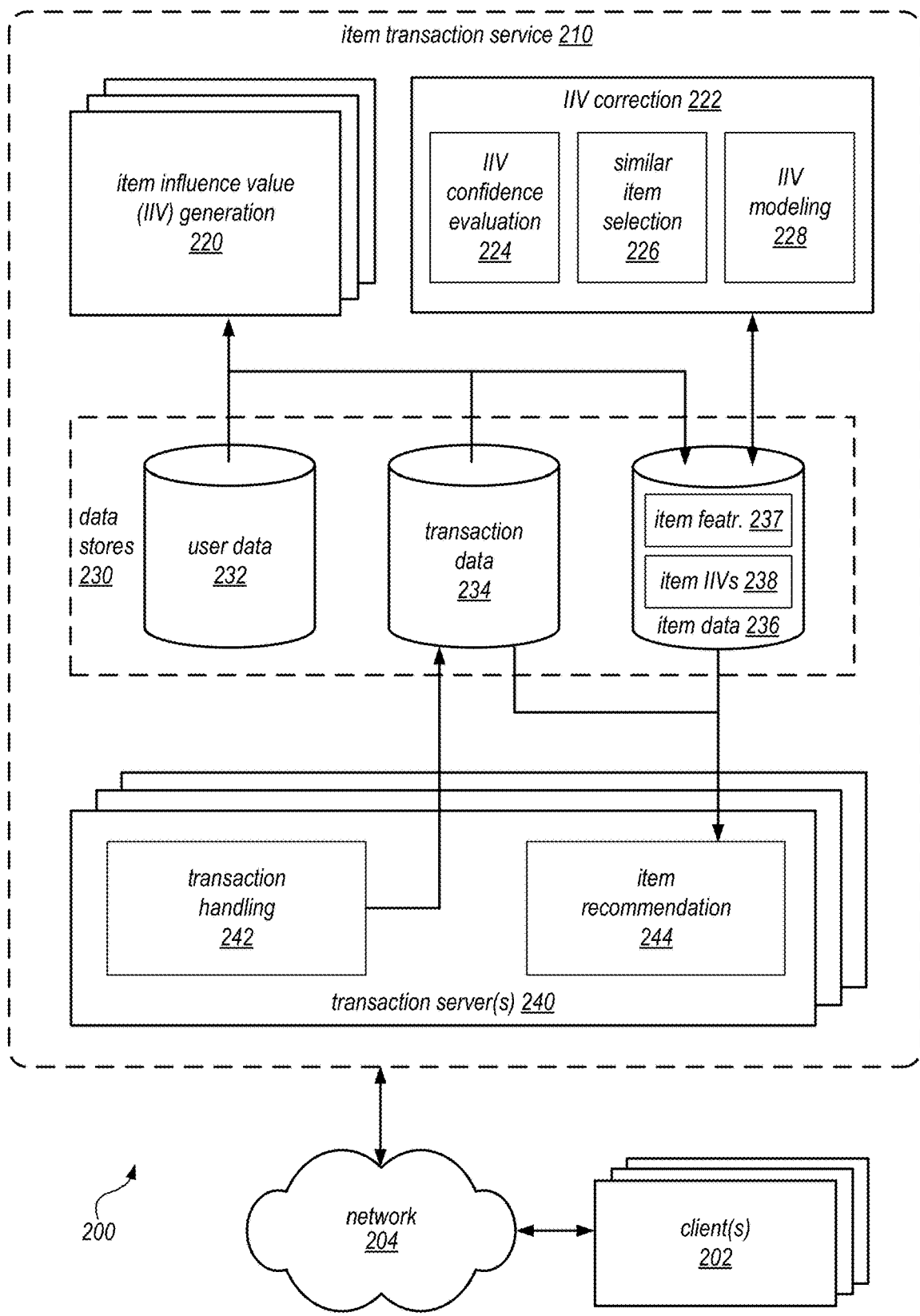
FIG. 2A is a block diagram illustrating an example item influence prediction system that determines item influence values using feature smoothing, according to some embodiments.

FIG. 2A is a block diagram illustrating an example item influence prediction system that determines item influence values using feature smoothing, according to some embodiments. As shown, the figure illustrates an item transaction service 210 that implements an item influence prediction system. It is noted however, that the item transaction service 210 represent only one application of the item influence prediction system. Other applications, such as item inventory planning systems, item recommendation systems, item advertising systems, item performance monitoring systems, etc., may also make use of the item influence prediction system described herein, and may implement the item influence prediction system as a subsystem. In some embodiments, the item influence prediction system may be implemented as a separate system outside of the production environment that is actually housing or modifying the item data (e.g., item data 236). In some embodiments, the item influence prediction system may be implemented as a third-party service.

As shown, the item transaction service 210 may interact with one or more clients 202 associated with users of the item transaction service, and over the network 104. The clients 202 may encompass any type of client configurable to communicate with the item transaction service 210. For example, a given client 202 may include a suitable version of a web browser, or may include a plug-in module or other type of code module configured to execute as an extension to or within an execution environment provided by a web browser. Alternatively, a client 202 may encompass an application such as an application (or user interface thereof) that may make use of the computing resources of the item transaction service perform various operations (e.g., browse or purchase items). In some embodiments, such an application may include sufficient protocol support (e.g., for a suitable version of Hypertext Transfer Protocol (HTTP)) for generating and processing network-based service requests without necessarily implementing full browser support for all types of network-based data. In some embodiments, clients 202 may be configured to generate network-based service requests according to a Representational State Transfer (REST)-style network-based services architecture, a document- or message-based network-based services architecture, or another suitable network-based services architecture.

The clients 202 may communicate with the item transaction service 210 via network 204. In various embodiments, network 204 may encompass any suitable combination of networking hardware and protocols necessary to establish network-based communications between clients 202 and item transaction service 210. For example, a network 204 may generally encompass the various telecommunications networks and service providers that collectively implement the Internet. A network 104 may also include private networks such as local area networks (LANs) or wide area networks (WANs) as well as public or private wireless networks. For example, both a client 202 and the item transaction service 210 may be respectively provisioned within enterprises having their own internal networks. In such embodiments, the network 204 may include the hardware (e.g., modems, routers, switches, etc.) and software (e.g., protocol stacks, accounting software, firewall/security software, etc.) necessary to establish a networking link between the client 202 and the Internet as well as between the Internet and item transaction service 210. In some embodiments, clients 102 may communicate with item transaction service 210 using a private network rather than the public Internet.

The item transaction service 210 may be implemented in a number of ways. For example, in some embodiments, the item transaction service 210 may be implemented using a group of web servers that presents a web interface to allow users of the clients 202 to browse or search for items, or make item transactions, via the web interface. In some embodiments, the item transaction service 210 may include a plurality of backend servers to process various tasks for the item transaction service 210. For example, in some embodiments, the item transaction service may include application servers that carry out various aspects of transactions, etc. As shown, the transaction handling functionality 242 are handled by the transaction servers 240. In some embodiments, the internal servers of the item transaction service 210 may include other servers, such as servers to interface with third-party merchants, to manage inventory, to generate various reports, to allow for system administration, and, as shown, to manage item influence data in the system (e.g., item influence value generators 220). In some embodiments, the item transaction service 210 may be hosted as an application in a service provider network, which provides the hardware computing resources to support the programmed functionalities of the item transaction service. In some embodiments, the servers or nodes in the system such as IIV generators 220 and transaction servers 240, and also resources such as data stores 230, may be provisioned by the service provider network to the item transaction service, which may be provisioned as virtual machine instances hosted on the physical machines of the service provider network. A person of skill in the art would understand that different item transaction services may be architected differently, and that the system architecture and functional components shown in the figure are merely illustrative.

As shown, the transaction servers 240 may include functional components such as transaction handling 242 and item recommendation 244. The transaction handling component 242 may be tasked with handling and completing transactions from users associated with clients 202. For example, the transaction handling component 242 may present successive web pages to the client 202 via the web interface, so as to allow the client to provide various information to complete the transaction. In some embodiments, the transaction handler component 242 may utilize payment subsystems to process user payment for a purchased item. In some embodiments, the transaction handling component may also interact with a fulfillment subsystem to initiate shipping of the item to the user. As shown, the transaction handler component 242 may record the transaction of users in one or more data stores 230.

As shown, the data stores 230 may store different types of data that are used by the item transaction service 210. For example, the data stores 230 may include data stores for user data, which may include user accounts of users that have registered with the system to make transactions. In various embodiments, the user data may include data such as a user's identity and authentication information, demographic information, contact information, physical address, transaction history, return rate, item ratings, and various calculated metrics regarding the user's behavior such as the user's apparent interests and spending habits, among other things. The data stores 230 may also include a data store for transaction data 234, which may include details of each transaction performed by the users. In some embodiments, each transaction may be associated with a transaction user, a transaction item, the amount paid for the item, and other events associated with the transaction, such as shipment events, returns, etc.

The data stores 230 may also include a data store for item data 236, which may include various metadata about each item that are listed on the item transaction service. Such metadata information may be provided by the supplier of the item when the item is initially added to the system's item catalog. In some embodiments, the item transaction service may be a marketplace that lists items from many third-party item suppliers. Accordingly, the item transaction service may provide a separate interface (e.g., a web interface) that allows third-party item suppliers to provide information about the item. Item information may include item features 237, such as the item's name, brand, price, description, category and subcategory, and various other attributes that are specific to the item's category or subcategory. For example, a television may have an item feature 237 that indicates its size. As another example, a book may have an item feature 237 that indicates a content category (e.g., fiction or non-fiction). In some cases, the item data 236 may also include various data that are collected by the item transaction service, such as sales data, user rating data, etc. As shown, an item influence value (IIV) metric 238 is also stored as part of the item data 236.

The IIV metric 238 may be associated with an item may indicate, for that item, an expected amount of subsequent transactions that is likely to be made by an item's purchaser in response to an initial transaction of the item. For example, the IIV 238 for an e-reader device may indicate that, in a 6-month time period after the initial transaction of the e-reader, that same user may make an additional $500 of transactions from the item transaction service, possibly in a particular category of goods such as e-books. The IIV 238 may be computed based on observed transaction data of users of the item transaction service, based on observation parameters specified by the system's administrator or the item's supplier. In some embodiments, the system's administrator or the item's supplier may specify parameters on how the IIV for the item should be determined. Depending on the embodiment, the IIV may be represented differently. In some embodiment, instead of a monetary amount, the IIV may indicate an index score, a rating, a probability of later transaction, an expected number of subsequent transactions, an expected time period of the item's influence, etc., or any combination thereof. Thus, as may be understood, the IIV may indicate any aspect of user behavior after an initial transaction of the item, which may be observed by the item transaction service 210. One or more of these IIV metrics may be determined based on the users' activities with respect to the item, and stored as part of the item's metadata 236.

As shown, the item transaction service 210 may include one or more item influence value generators 220. In some embodiments, the item influence value generators 220 may be implemented using the same physical or virtual machines as the transaction servers 240. In some embodiments, the item influence value generators 220 may implement components such as an item influence value (IIV) generation module. In some embodiments, the module may be run as background processes or scheduled processes that periodically updates the IIV values 238 stored with the item data 236. Such periodic updates to the IIVs 238 may be performed according to a specified scheduling, along with observation and/or smoothing parameters, which may be specified by a system administrator or an item supplier. For example, the IIV generation module may update the IIV values 238 on a weekly basis.

In some embodiments, the IIV generation module may be configured to execute a process to determine an IIV for an item, based on the transaction data 234 and the user data 232. In some embodiments, the process may include extracting a treatment set of "events" from the transaction data 234, where each event comprises a series of transactions over a time period by different users of the item transaction service. Each event in the treatment set may include an initial transaction of a particular item (i.e., the item for which the IIV is to be observed), and a number of follow-on transactions during a time window after the initial transaction. In some embodiments, the event may indicate the follow-on transactions simply as the aggregate monetary amount of these transactions. In addition, the process may also generate a control set of events from the transaction data, where each event in the control set does not include an initial transaction of the particular item. The process may then use a subclassification (SC) technique to separate users in the treatment set into a series of groups based on a propensity score of each user. The propensity score may indicate the propensity of the user to make the initial transaction. In some embodiments, the propensity score may be determined from a propensity model based on the user's attributes in the user data 232, such as gender, age, etc. In some embodiments, the propensity model may be updated less frequently than the IIV value. Next, the process may determine a difference between the outcomes (e.g., aggregate dollar value of follow-on transactions) of the treatment set and the control set, within each propensity score group. Then, the process may determine the overall observed IIV of the item based on an averaging of the outcome differences from each propensity score group. The observed IIV may then be written to the data stores 230 as part of the item data store 236. As may be understood, this process of determining the observed IIV is merely illustrative and may vary from embodiment to embodiment.

In some embodiments, the item transaction service 210 may include an IIV correction node or server 222. As with the IIV generators 220, the IIV correctors 222 may be a standalone server or a cluster of nodes, which may in some embodiments be virtual machine instances. As will be discussed in detail below, the IIV corrector 222 may perform a smoothing function to adjust or update observed IIV values whose variance or confidence interval is unacceptably large. In some embodiments, the IIV corrector 222 may employ an IIV confidence evaluation module 224, which may check the IIV values 238 of the items to verify whether the confidence level associated with the IIV is sufficiently high. The IIV corrector 222 may periodically sweep the item IIVs 238 to find IIVs that require smoothing. In some embodiments, the IIV corrector 222 may be directly invoked by the IIV generator 220, such that every time a new observed IIV is determined, its variance and/or confidence interval is examined to determine if a smoothing step is needed.

In some embodiments, the IIV corrector 222 may be configured to execute a process to generate a new IIV for an item, based on the item's observed IIV and the observed IIVs of a set of comparable items. The smoothing process may be performed to reduce the variance or confidence interval of an observed IIV, which may be too large (e.g., exceeds a specified threshold). In some embodiments, the observed IIVs in the item data 236 may be swept to check if their variance or confidence interval exceeds a specified threshold, and if so, the smoothing process is performed. In some embodiments, the IIV observation module 222 may directly invoke the IIV corrector 222 immediately after an observed IIV is determined, so that any observed IIV with unacceptably large variance or confidence intervals are smoothed.

The IIV corrector 222 may generate a new IIV 238 for an item whose IIV value is associated with low confidence. In some embodiments, the generation process may select, using a similar item selection module 226, a set of comparable items to a particular item whose observed IIV is to be smoothed. The selection may be performed programmatically or based on user specifications. In some embodiments, the IIV corrector 222 may then use an IIV modeling module 228 to construct a model of the IIV based on features of the selected items. The IIV modeling module 228 may tune the parameters of the IIV model using the features and observed IIV values of the set of comparable items. For example, in some embodiments, the IIV module may be a linear combination of an item's features using a set of feature weights. These weights may then be tuned so that the linear function produces for each comparable item, based on each item's respective features, a IIV value that approximates the observed IIV value for each item. The tuning process may repeat over a number of iterations, until a satisfactory set of model parameters are found. The resulting model parameters are then used to determine a new IIV value for the particular item. This new IIV is likely to approximate the observed IIV of the particular item. Moreover, because the new IIV value is determined from many items, its variance and confidence interval is reduced, as compared to the observed IIV value. As will be discussed in further detail, the tuning process may employ at iterative approximation technique, such as Expectation Maximization, stochastic gradient descent, or some other technique.

Figure 2B:
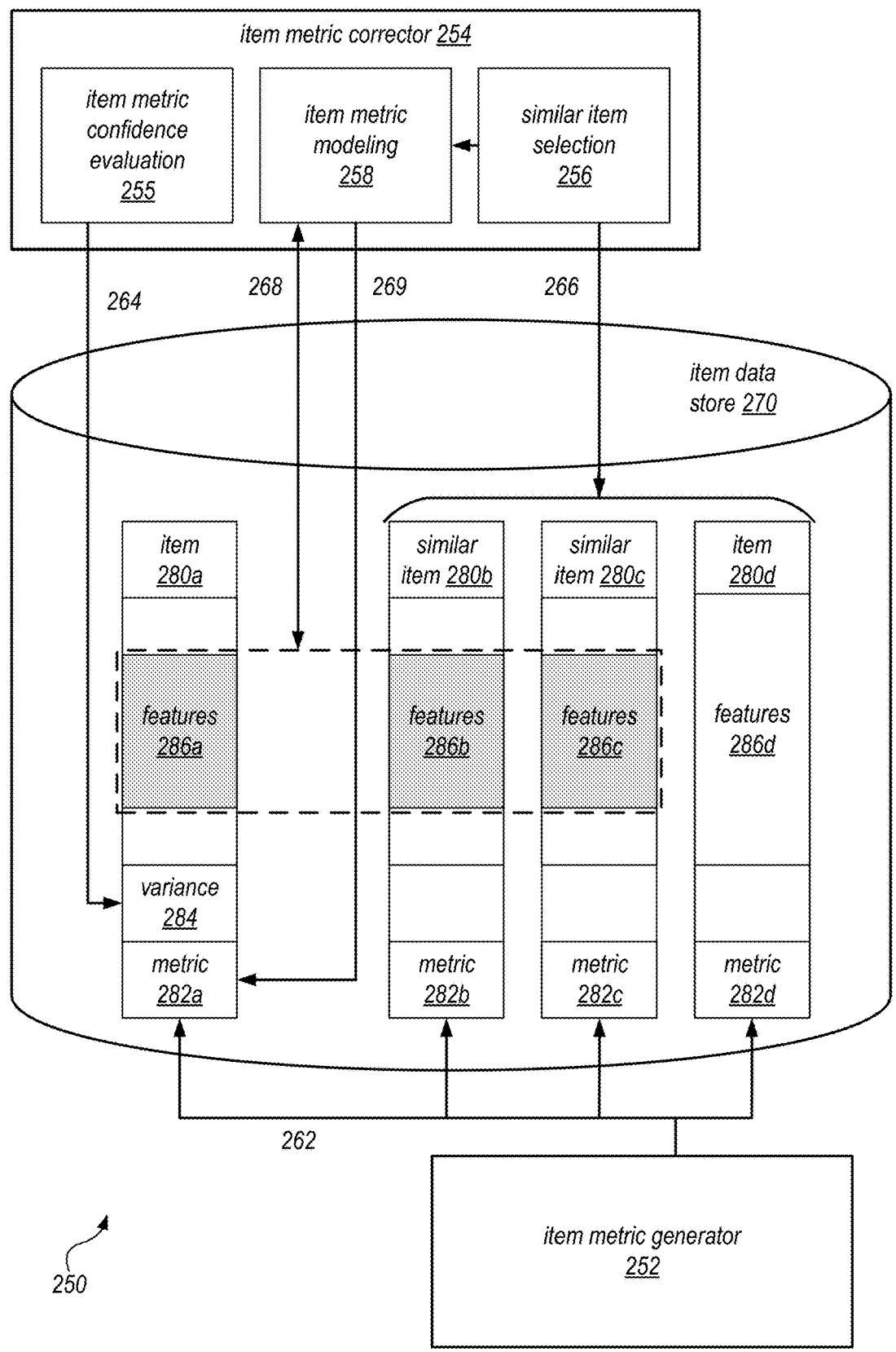
FIG. 2B illustrates the operations an example item metric correction subsystem, according to some embodiments.

FIG. 2B illustrates the operations an example item metric correction subsystem, according to some embodiments. As shown, system 250 includes an item metric generator 252, which may be an IIV generator 220 as discussed in connection with FIG. 2A, and an item metric corrector 254, which may be an IIV corrector 222 as discussed in connection with FIG. 2A. The item metric generator may determine 262 for each item stored in the item data store 270, as shown, an item metric value (e.g., values 282a-d), which may be determined based on transaction data and user data stored in other data stores. In some embodiments, the item data store 270 may be the item data store 136, as discussed in connection with FIG. 2A.

In some embodiments, the item metric corrector 254 may periodically correct or update some item metric values, when it is determined that the item metric values are associated with a low confidence level. For example, as shown, the item metric confidence evaluation module 255 may be used to check 264 a variance 284 of item 280a. The variance 284 is one example statistical metric that can be used to determine a confidence level of the item's metric. Other statistical metrics may also be used, including for example a confidence interval of the metric, or a sample size used to determine the metric. These confidence metrics may be generated and stored by the item metric generator 252, as it generates the item metric value 282a for the item. Thus, for example, an item metric value that has a very large confidence interval, high variance, or low sample size, may be deemed to have a low confidence level. In some embodiments, a combination of statistical metrics may be used to determine the confidence level. In some embodiments, the item metric confidence evaluator 255 may compare the confidence level to a specified threshold, so that when the confidence level is below the threshold, the item is flagged to have its metric value updated by the item metric corrector 254. In some embodiments, the item metric confidence evaluator 255 may be optional. Thus, item metric corrector 254 may perform item metric correction on all observed metric values in the item data store 270, without regard as to the confidence level of the observed metric values. In some embodiments, the item metric correction may be triggered by conditions other than the confidence level of the observed metric values. For example, in some embodiments, the item metrics of a particular group of items may always be corrected using the same items in that group.

Once it is determined that the confidence level of item 280a is too low or below a threshold, the item metric corrector 254 may employ a similar item selector 256 to select 266 a number of similar items to the item for which the item metric is to be updated (here item 280a). The selection may be performed using one or more similarity criteria. For example, in some embodiments, the similarity criteria may specify that similar items will have one or more common features as the item in question. In some embodiments, such common feature may include, for example, a common item name (or part of the item name), a common item category (or subcategory), a common brand, or a common price (or price range). In some embodiments, the similarity criteria may be specified by a user or administrator of the system. In some embodiments, a user or administrator may simply designate a set of items in the system as the similar or comparable items to be used to generate the new item metric. As shown, in the figure, items 280b and 280c are selected as similar items to item 280a, but item 280d is not selected as a similar item.

Once a set of similar or comparable items are selected, in some embodiments, an item metric modeling module or subsystem 258 may be employed to construct 268 a feature-based model for the item metric. For example, in some embodiments, the model may be based on the items features (e.g., features 286a-d). In some embodiments, the features may be used as parameters to a function, which takes the features and computes the item metric based on the features. For example, the function may be a weighed linear combination of the features, using a set of feature weights. The feature weights may be tuned so that the output of the model best approximates the observed metric values for all of the selected similar items. In some embodiments, this tuning may be performed using an Expectation Maximization process. In some embodiments, the set of features used by the modeler 258 may be specified by a user or administrator. As shown, in the figure, some subset of features (shaded) are used to generate the item metric model.

Once the item metric model is fully tuned, the item metric modeling module 258 or some other module of the item metric corrector 254 may determine a new or corrected item metric value for the item in question, here item 280a, using the item metric model and the relevant features of the item. In many cases, the new item metric will be different from the observed item metric. However, because the new item metric is computed based on the model that is tuned using many other items, the new item metric value is associated with higher confidence (e.g., a smaller confidence interval). At that point, the item metric corrector 254 may update the item data for item 280a, to replace the item metric 282a with the new item metric value determined using item metric model. The item metric corrector 254 may perform this correction for all items whose item metric values are associated with a low confidence level.

Figure 3A:
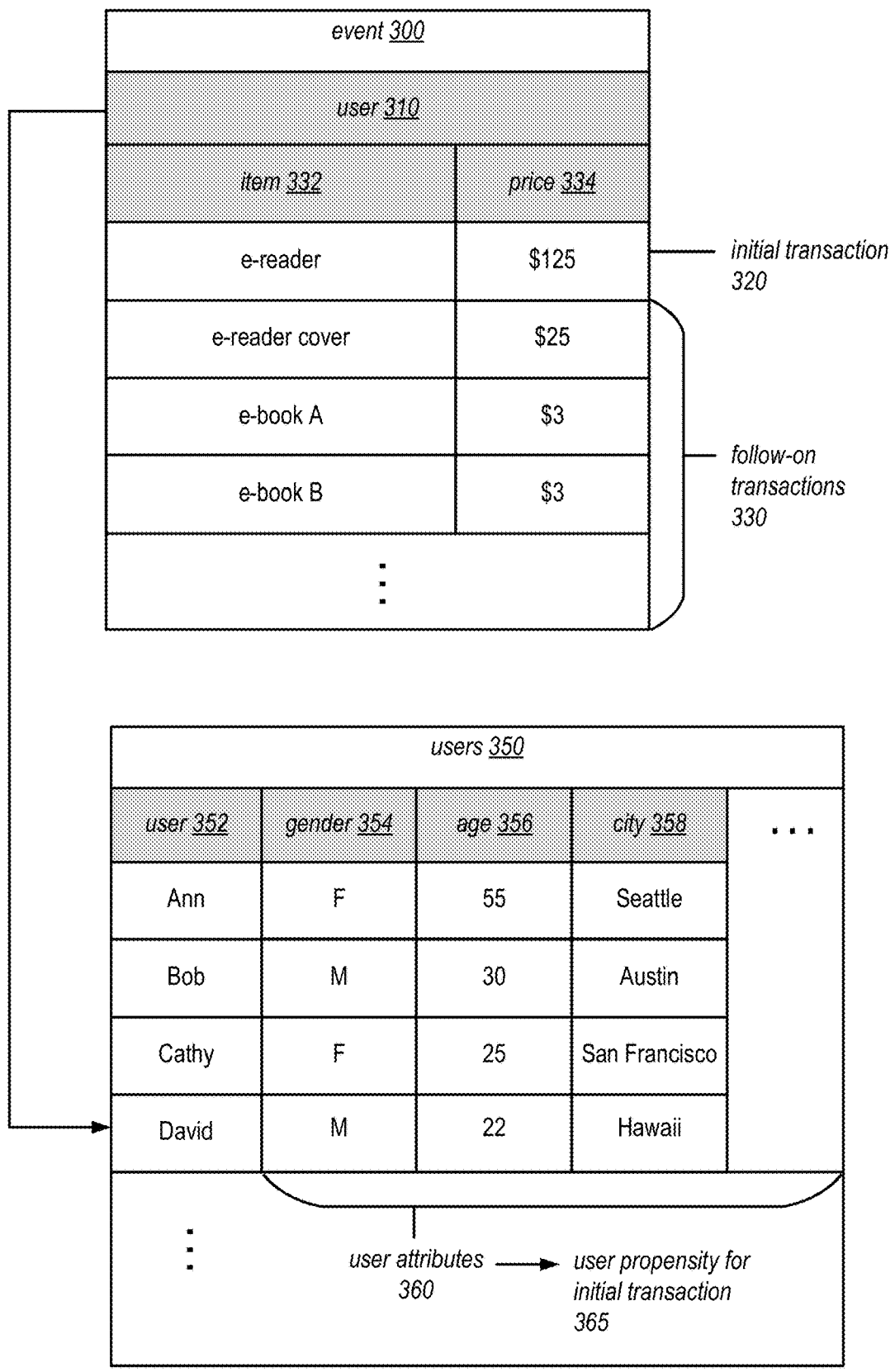
FIG. 3A illustrates an example event used by an item influence prediction system to determine item influence values for items, according to some embodiments.

FIG. 3A illustrates an example event used by an item influence prediction system to determine item influence values for items, according to some embodiments. As shown, the figure depicts an event 300 which may be used as an observation to determine an observed IIV, and also a set of users 350, which may be a portion of all users registered on an item transaction service, such as the item transaction service 210.

The event 300 may comprise a number of transaction records, as shown. These records may come from transaction data store 234, as discussed in connection with FIG. 2A. The event 300 may include transactions made by a particular user (user 310) that occurred during a period (e.g., 6 months). The event 300 may include an initial event 320, which in this case is the transaction of an e-reader. Thus, this event may be used to (along with other events with the same initial transaction) as treatment data to estimate the influence value of the e-reader item. The event 300 also includes a number of follow-on transactions 330, which may be limited to a particular time window after the initial transaction (e.g., 6 months), or to a particular category of items (e.g., accessories for the e-reader from the same brand). These parameters for the event 300 may be specified by a user to gather the type of events that are to be used to determine the desired type of IIV. In some embodiments, the follow-on items 330 may simply be reduced to an aggregate monetary amount for all qualifying follow-on items in the event (in this case, $25+$3+$3 . . . ). As discussed, other types of outcomes (e.g., number of separate transactions in the window, etc.) may also be used as the IIV.

As shown, the event 300 is associated with a single user 310, so that the all of the transactions in the event are made by that user 310. The user may correspond to a registered user of the system, whose metadata is stored in a "users" data set 350. The users data set 350 may be part of user data store 232, as discussed in connection with FIG. 2A. In some embodiments, event 300 may be a record in a table or an events data object, and users 350 may be another table or data object, both stored as part of a database or in a data store 230, as discussed in connection with FIG. 2A. The users data set 350 may store different attributes of the registered users, such the users' name 352, gender 354, age 356, and city 358, etc. In some embodiments, at least a portion of these user attributes 360 may be used to determine a user propensity 365, which indicates each user's propensity to make the initial transaction (here the e-reader in event 300). In some embodiments, this propensity may be reduced to a per-user propensity score, and used to classify users into groups so that the IIV value may be determined by matching users having similar propensities for the initial transaction.

Figures 3B, 3C:
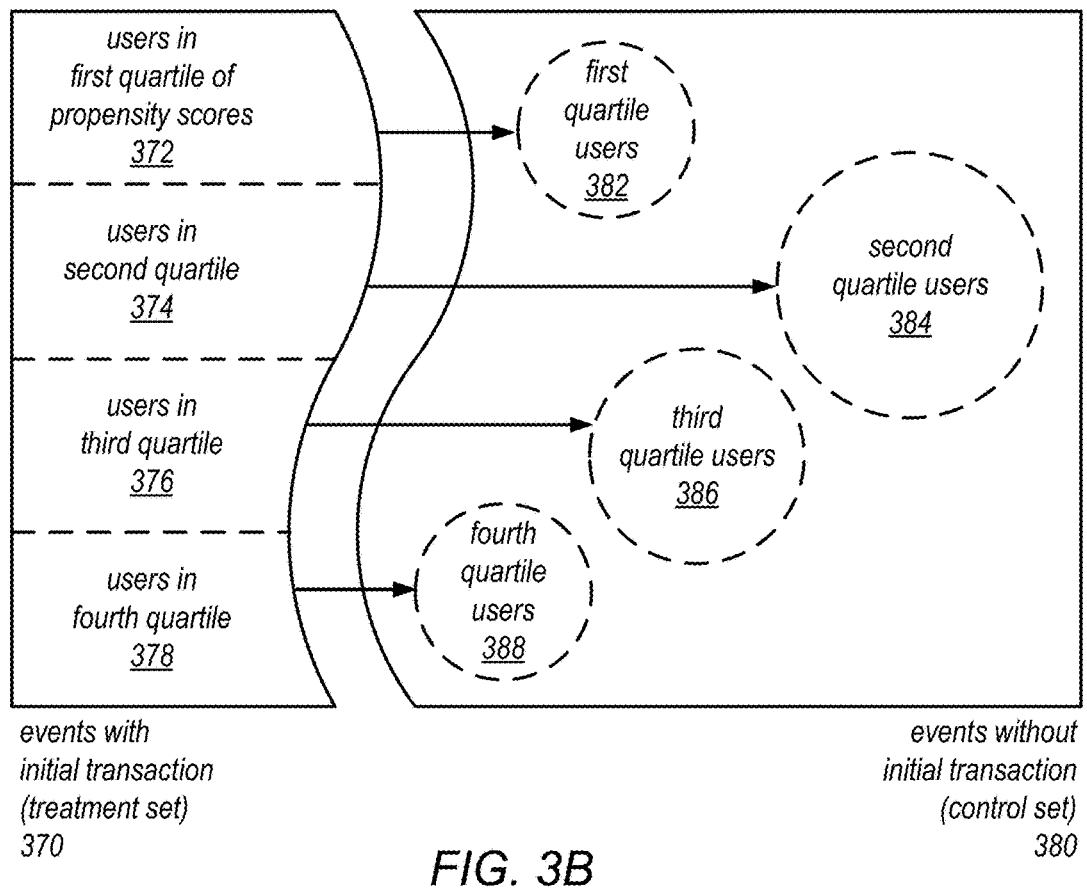
FIGS. 3B and 3C illustrate example stages in a determination of item influence values for items, according to some embodiments.

FIGS. 3B and 3C illustrate example stages in a determination of item influence values for items, according to some embodiments. FIG. 3B illustrates a propensity matching of events between events from a treatment set 370 (e.g., events where the initial transaction was made), and some control set 380 (e.g., events where the initial transaction was not made). Often, the control set may be a much larger set than the treatment set, and in some embodiments, the control set 380 may be obtained by subtracting the treatment set from a random sample of the transaction data.

Propensity matching is a statistical matching technique that attempts to estimate the effect of a treatment, policy, or other intervention by accounting for the covariates that predict receiving the treatment. Propensity matching attempts to reduce the bias due to confounding variables found in an estimate of the treatment effect obtained from simply comparing outcomes among units that received the treatment versus those that did not. In this context, the possibility of bias arises because the apparent difference in outcome (i.e. IIV value) between these treatment and control data sets depend on characteristics that affected whether or not an event received a given treatment (i.e. made the initial transaction) instead of due to the effect of the treatment per se (i.e. caused by the initial transaction). For example, if a user tends to generally buy a lot of electronic device items, that user may both purchase the e-reader shown in event 300 and also make a lot of follow-on transactions. However, it would be misleading to compare this user with another user who rarely purchases any electronic devices. The first user's large follow-on transactions were not caused by the initial transaction. The matching of propensity scores thus attempts to mimic true randomization by creating a sample of events that received the treatment that is comparable on all observed covariates to a sample of events that did not receive the treatment.

Thus, in the IIV determination process, all users are first assigned a propensity (e.g., a propensity score) that indicates the propensity of the user to make the initial transaction. This propensity score may be determined from the attributes of each user, which is stored as part of the user data, such as the user data set 350. In some embodiments, a logistic regression model is determined to compute the propensity score based on a sample of users to fit the actual decisions of the users to make the initial transaction. Then, using the logistic regression model, the propensity scores of all users associated with events in the treatment set 370 and all users associated with events in the control set 380, are determined. In some embodiments, the propensity model may be determined ahead of time, and reused over several determinations of the IIV for that item. For example, the IIV for an item may be determined on a weekly basis, and the propensity model may be determined more slowly, for example once every month, using a larger data set.

After the users in the treatment set 370 and control set 380 are assigned propensity scores, events in the treatment set 370 are divided into a number of bins, or propensity score groups. As shown, the treatment set 370 is divided into four groups 372, 374, 376, and 378, which may in some embodiments correspond to respective quartiles of the user propensity scores in the treatment set. In other embodiments, more or fewer number of propensity score groups may be used. In some embodiments, the groups may be divided such that each group has approximately the same proportion of events. A group of matching events is then found in the control set 380 for each of the groups 372, 374, 376, and 378 in the treatment set, so that each group of treatment events is compared against its corresponding group of control events (e.g., groups 382, 384, 386, and 388). Note that in general, some events in the control set 380 may not be selected for any matching group, since the control set is large and contains events associated with users who are not analogous to any of users in the treatment set in terms of their propensity scores.

In FIG. 3C, an overall IIV for the item is determined from the outcome (e.g. follow-on transaction amount) differences for each propensity score group, between the treatment events and the control events. The table in the figure shows intermediate values that are determine during this process. As shown, column 392 shows an average monetary amount indicative of follow-on transactions for events in the treatment set, for each of the four propensity score groups. Column 394 shows an average monetary amount indicative of follow-on transactions for events in the control set, for the four propensity groups. Column 396 indicates the difference between the outcomes of the treatment set and the control set for each of the four groups. Finally, the observed IIV for the item 398 is determined from an averaging of the outcome differences of the four groups. The observed IIV value may then be stored (for example as part of the item data 136), to be used for later purposes such as item recommendations, selection of items for advertising, inventory planning, etc.

Figure 4:
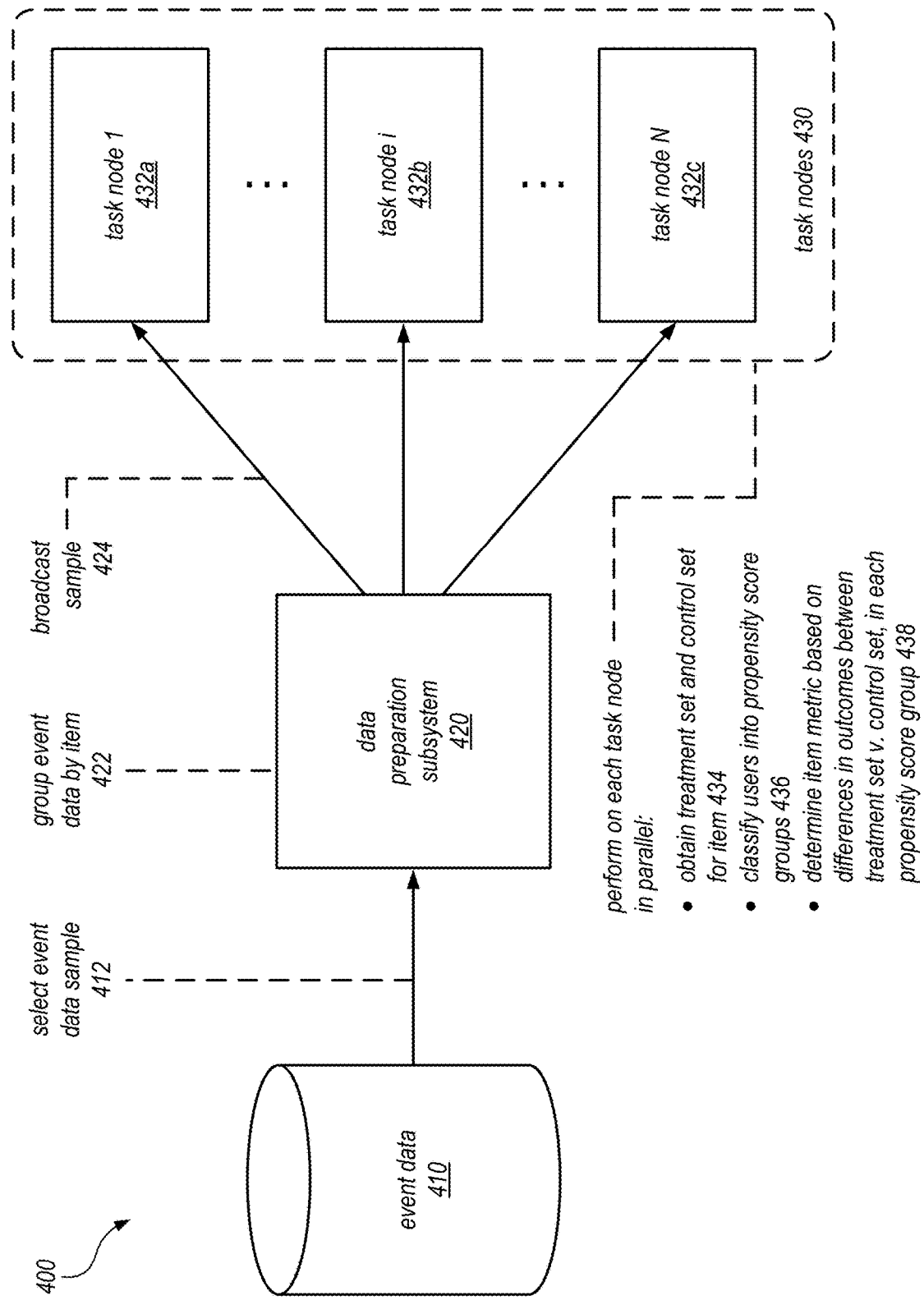
FIG. 4 illustrates an example process flow to determine item metrics for items using multiple task nodes, according to some embodiments.

FIG. 4 illustrates an example process flow to determine item metrics for items using multiple task nodes, according to some embodiments. The figure shows a particular embodiment of an item metric system 400 that employs a plurality of task nodes 430, such as task nodes 432*a-c*, to determine item metric values for a large number of items in parallel. The task nodes 432*a-c* may be independently executing nodes, which may be implemented by separate processors and associated memory. In some embodiments, the task nodes may be implemented as virtual machine instances hosted on one or more physical hosts. In some embodiments, the task nodes may be independently executing tenants hosted inside a multi-tenant execution container. In some embodiments, the task nodes may be implemented as a cluster computing system, using for example the APACHE™ SPARK™ framework, or some other cluster computing framework.

The example process flow starts at operation 412, where a sample of event data is selected from a event data store 410. Operation 412 may be performed by a data preparation subsystem 420, as shown, or one or more of the task nodes 430. The event data store 410 may be, for example, part of the transaction data store 234 or another data store 230, as discussed in connection with FIG. 2A. In some embodiments, the event data sample may be selected in a pseudo-random fashion. In some embodiments, the event data sample may be shared by all of the task nodes 430 to compute individual item metrics. In some embodiments, the sample may be different for different task nodes. For example, the event data sample may be used by each task node to produce a control data set to be used for the item metric determination. In some embodiments, the event data sample may be sized so that the sample will fit within the memory of each task node. In some embodiments, the event data sample may be updated periodically (e.g. quarterly), and redistributed to the task nodes. In this manner, time-dependent variations in the event data may be reflected in the item metric determination process.

At operation 422, the data preparation subsystem 420 groups the event data by item. In some embodiments, the event data used in this operation may be limited to the event data sample obtained in operation 412. In other embodiments, the event data used in this operation may encompass all of the event data in the event data store 410. In some embodiments, the grouping may organize particular event records in the event data into sets of treatment events that are used for item metrics determination. That is, the grouping operation may determine a set of treatment events for each item. For example, in the context of determining item influence values, each treatment event may include an initial transaction of a particular item before a time window, and some measure of follow-on transactions during the time window (e.g., monetary amount, number of transactions, etc.) As discussed, the follow-on transactions may be limited based on configuration settings from the users, such as by time, item category, etc. Treatment sets may be determined for all items whose item metric will be determined. In some embodiments, the data preparation subsystem 420 may maintain its own data store that is separate from the event data store 410, so as to minimize its impact on the event data store 410, which may be part of a production item transaction service. In some embodiments, the data used to determine the item metrics may be downloaded and processed automatically and periodically by the data preparation subsystem 420.

At operation 424, the event data sample obtained in operation 412 is broadcast to the task nodes 430. As discussed, the task nodes may use this event data sample to generate a control set to use to determine each item metric. In some embodiments, the distribution may be performed by a data broadcast functionality implemented by a cluster computing framework managing the task nodes, for example, the broadcast functionality implemented in the APACHE™ SPARK™ framework. By exploiting the in-memory computation capabilities of SPARK™ or similar frameworks, communication overheads during the process are reduced, and the event data sample may be distributed and used more efficiently at the task nodes.

The process flow then shifts to the task nodes 430, which may each independently determine an item metric for an individual item. Thus, work that is different from item to item may be performed on the individual task nodes, which may be parallelized. In some embodiments, the task nodes 430 may repeatedly work on a queue of items to determine each item's item metric, until the queue is exhausted. By dividing the work in this fashion, the entire process is made scalable, so that the process can scale to a very large number of items by increasing the number of task nodes, as needed.

At operation 434, a task node obtains the treatment set and control set for the particular item that whose item metric will be determined. In some embodiments, the treatment set may be obtained via a request to the data preparation subsystem 420. In some embodiments, the treatment set may simply be obtained from a data store of treatment data which stores the results of the grouping operation 422 performed by the data preparation subsystem 420. In some embodiments, the control set may be obtained by subtracting the treatment set from the event data sample that was received as a result of the broadcast operation 424. Thus, for example, for the determination of item IIVs, the treatment set will have all events that included an initial transaction of the particular item, and the control set will have a large number of events that do not include the initial transaction of the particular item.

At operation 436, a task node may classify users in events in the treatment set into propensity score groups. For example, to determine the item influence value, in some embodiments, a propensity model may be determined to estimate a propensity score, which indicates a user's likelihood of making the initial transaction, based on the user's attributes. The user's attributes may be determined from, for example, the user data 232 in FIG. 2A. In some embodiments, the propensity model may be a logistic regression model that is determined to fit the user's observed initial transactions to their attributes. Using the propensity model, the task node may then compute propensity scores for the users in each event in the treatment set, and separate the events into groups based on the propensity scores. For example, the task node may separate the treatment set into five propensity score groups. The task node may then find a set of events in the control set that matches the propensity scores of each of the groups in the treatment set, so that a comparison may be made between the item metric values of two respective groups having similar propensity scores.

At operation 438, the overall item metric is determined based on differences in the outcomes (e.g. follow-on transactions) in the treatment set versus the control set, in each propensity group. Thus, per-group difference may first be determined for each propensity group, between the treatment set outcomes and the control set outcomes. These differences may then be averaged across all propensity score groups to obtain the overall observed item metric value for the item.

As may be appreciated by those skill in the art, various methods may be used to determine the IIV that takes into account the propensity of users to make the initial transaction. Such methods including for example, propensity score matching, inverse weighting, propensity score subclassification (SC), regression adjustment, etc. In some embodiments, techniques such as Doubly-Robust (DR) schemes may be used to combine two or more approaches. For example, a DR scheme may ensure consistency when either a model for the distribution complete data (e.g., propensity score estimation) or a model for determining other missing information (e.g. via regression estimation) is correctly specified. However, the computational process of the DR approach makes the method relatively burdensome for simultaneously computing IIVs over a large number of items. When the determination of IIVs is parallelized over many task nodes for many items, in some embodiments, the SC approach is preferred as a faster approximation to the DR approach. Because the SC method only requires a propensity model to compute the IIV and bypasses the construction stratification-level regression models, it is generally faster and less resource intensive than DR methods, and more easily parallelized over a plurality of task nodes.

In some embodiments, as shown, it is preferable to create the control set independently on each of the task nodes. This is because the distribution of a large set of sample transaction data involves a heavy network overhead. Thus, in some embodiments, the same event data sample is efficiently made available to all task nodes using an efficient broadcast operation. The distribution may be performed as an initial step that does not slow down the item metric determination process. The task nodes may then perform multiple item metric determinations in parallel. Another operation that is computationally intensive in the process is the training of the propensity model for each item. In some embodiments, these propensity models may also be created in parallel, on each of the task nodes. Using one such embodiment as shown in the figure, IIVs for a group of 130,000 items were determined using a 10-node cluster in 15 hours. An example algorithm for determining IIVs for a large number of items is shown below in pseudocode:

Scalable Algorithm to Determine IIVs for Large Number of Items

```
procedure ComputeIIVs
    SampleData←LOAD sample transaction data
    BROADCAST SampleData
    TransactionData←LOAD transaction data
    AllEventsTreatmentData←GROUP TransactionData by
        event for each event do (in parallel on each task node):
        TreatmentData←AllEventsTreatmentData(event)
        ControlData←SampleData\TreatmentData
        ModelTrainingData←TreatmentData U ControlData
        Build propensity model
        Classify users into groups based on propensity scores
        Compute average treatment and control outcomes in
            each group
        Determine IIV of the event
    end for
    COLLECT all IIVs
end procedure
```

FIGS. 5A and 5B illustrate example stages in a feature smoothing process to reduce the confidence interval of observed item influence values, according to some embodiments. In some embodiments, a IIV smoothing technique may be performed by a IIV corrector, such as IIV corrector 222 shown in FIG. 2A, to reduce the variance of confidence interval of an observed IIV determined by the item influence prediction system. In some embodiments, as soon as an observed IIV is determined, for example, via a process shown in FIG. 3 or 4, the item influence prediction system may check whether the variance or the confidence interval of the observed IIV is above a specified threshold. If so, the system may invoke the IIV corrector to perform the smoothing technique. An observed IIV may have a large variance or confidence interval if it only has a few observation events (e.g., a new item that has only been purchased a few times), or if some of its outcomes are spread over a large range.

FIG. 5A depicts a table of items 510 whose observed IIVs 512 have been determined. As illustrated, each item is associated with an observed IIV 512 that reflects an expected amount of follow-on transactions, in terms of dollar amounts, that are caused by the transaction of the item. In column 514, a sample size is shown. The sample size 514 may indicate the number of treatment events that were used to determine the observed IIV. For example, the IIV for the laptop (brand A) item may be determined using 3258 events, while the IIV for the e-reader (brand B) item may be determined using only 12 events. The column 516 indicates a confidence interval for each of the observed IIVs. The confidence interval may indicate a range around the observed IIV where an expected value is expected to fall, within a certain degree of confidence (e.g., 90% confidence). The confidence interval value may be determined based on the variance of the observed IIV, which may in turn be dependent on the number of observed events for the IIV. As may be seen, for the e-reader (brand B) item, the confidence interval 516 is extremely large, because only 12 events were used to generate that IIV. Accordingly, in some embodiments, the item influence prediction system may flag this IIV to be smoothed.

FIG. 5B depicts another table indicating the intermediate data generated and used during a smoothing process to generate a new IIV. In the figure, a set of similar or comparable items 520 has been selected for the e-reader (brand B) item, whose observed IIV was selected to be updated. The set of comparable items 520 may in some embodiments have certain commonalities with the items whose IIV is to be smoothed. For example, in the illustrated example of FIG. 5B, some comparable items are of the same brand as e-reader (brand B), and all items are electronic devices, which is the same item category as e-reader (brand B).

In some embodiments, the smoothing technique may determine a IIV model to generate new IIVs that approximates the observed IIV values for each of the items in the comparable item set, according to a feature score function. The feature score function may take a set 526 of relevant features of the items, and produce a new IIV. In the end, the observed IIV of the e-reader (brand B) item is replaced with the new IIV. Because the new IIV is determined using multiple items, the variance and confidence interval of the new IIV is reduced as compared to the observed IIV.

As shown, the set of item features used to smooth the IIV 526 may include a variety of features, such as the item's price 522, user rating 524, etc. In some embodiments, additional item features may be used, for example, the item's category or subcategory, the item's price range, the item's brand, among other things. In some embodiments, the set of comparable items 520 and set of item features 526 may be manually selected by an administrator or the item's supplier ahead of time. In other embodiments, these parameters may be automatically selected by the item influence prediction system, based on some specified policy and/or in a pseudorandom fashion.

At operation 528, the smoothing technique is applied to the comparable items and their features to generate a IIV model for all of the items, and the IIV model is then used to generate the new IIV 530 for each item. In some embodiments, the new IIV for some items may be discarded, as the observed IIV is deemed to be superior data. However, for some items such as e-reader (brand B), the new IIV 530 represents better data. In column 532, the smoothed confidence interval 532 for the new IIVs 530 are shown. As shown, the smoothed confidence interval for the e-reader (brand B) is now much smaller, indicating a range of less than $1. This is because the new IIV is determined from the data of multiple other items, some of which have IIVs estimated from many events and thus have low variances. Accordingly, via the smoothing process, the high variance of some observed IIVs may be lowered.

Figure 6:
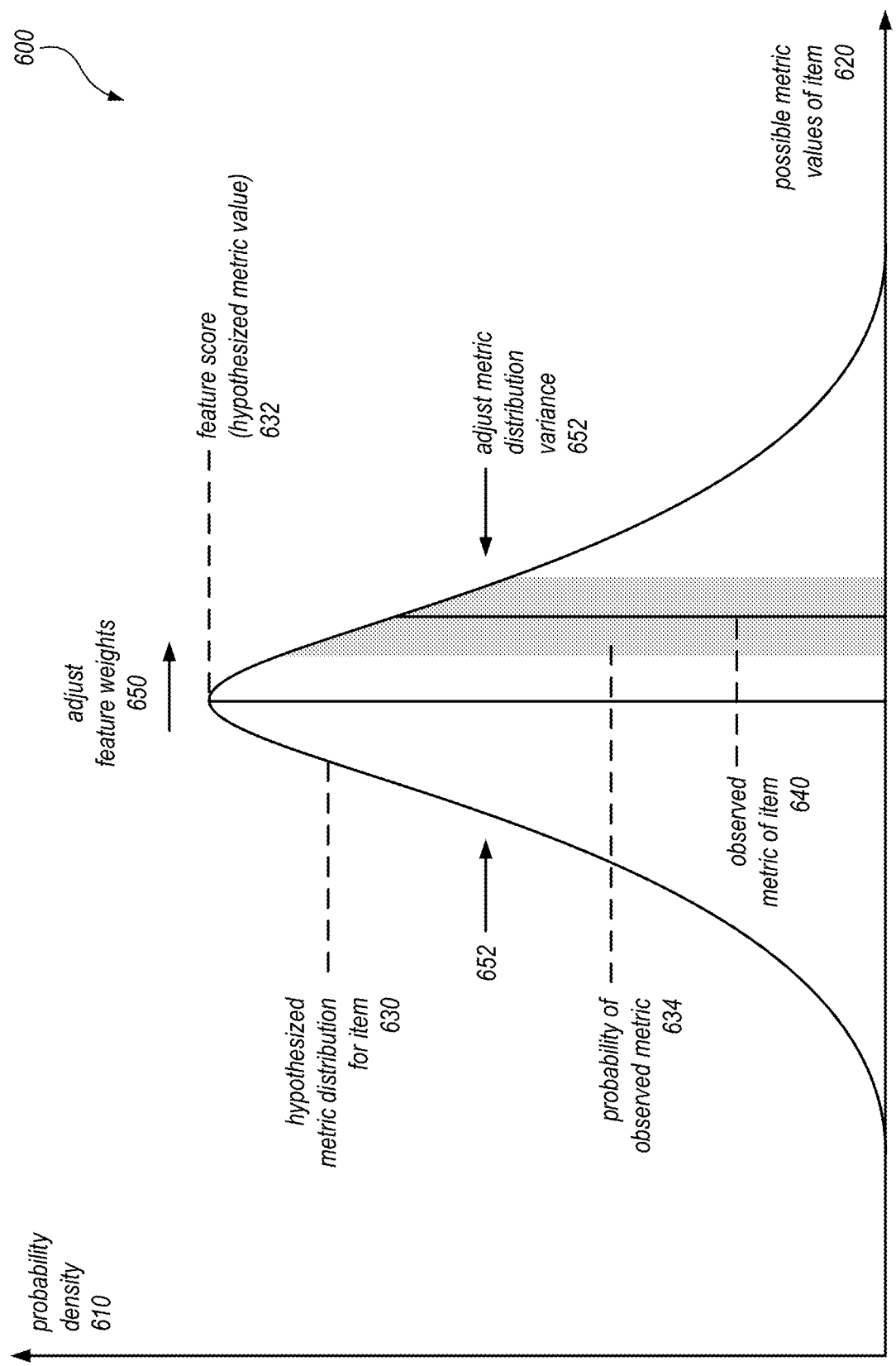
FIG. 6 illustrates a hypothesized probability distribution of an item metric of an item, used in a feature smoothing technique to reduce the confidence interval of observed item metric values, according to some embodiments.

FIG. 6 illustrates a hypothesized probability distribution of an item metric value of an item, used in a feature smoothing technique to reduce the confidence interval of observed item metric values, according to some embodiments. The figure illustrates an item metric model that is fitted to generate item metric values that approximate the observed item metric values of a set of items (e.g., a set of similar or comparable items to a particular item whose item metric is to be corrected), based on the respective features of these items.

In some embodiments, a smoothing technique may be employed, where a hypothesized item metric model is constructed to determine a hypothesized value of an item's metric, based on the item's features. In some embodiments, the model may use a weighted linear combination of the item's features to determine this hypothesized item metric, based on a set of feature weights. Thus, the linear combination may multiply each of the item's features by a respective feature weight, and then sum all of the resulting weighed feature values to produce a feature score. In some embodiments, this feature score represents the hypothesized metric value of the item. The item metric model may then adjust the feature weights in the linear function to fit the observed item metric values for the group of comparable items.

The figure shows the hypothesized item metric value at point 632 in the distribution curve. As shown, the graph is a probability distribution 630 of possible metric values for one item (e.g., the particular item whose item metric is to be smoothed). The horizontal axis of the graph indicates possible item metric values for the item, and the vertical axis of the graph indicates a probability density of the item metric value under the hypothesized item metric model. As shown, the mean of the distribution is at point 632, i.e., the most likely expected item metric value under the model, is at the computed feature score of the feature function (e.g., the weighted linear combination of the item's features).

The actual observed item metric value for the item is shown at point 640. As shown, the observed item metric 640 may be different from the hypothesized item metric 632 computed from the item metric model. The colored area under the distribution at 634 represents the probability that the observed item metric will occur under the model. The modeling process will attempt to maximize the colored area under the distribution curve to fit the model to the observed item metric value.

Importantly, the modeling process will attempt to maximize this probability for all items in the comparable item set, using a set of common parameters. In particular, the feature score function (e.g., the feature weights used to generate the feature score) will be the same for each comparable item, and the model distribution variance will be the same for each item. As may be understood, the variance value indicates a level of confidence of how well the item metric model will work to predict the observed item metric values. This variance may include inherent randomness in the relationship between the actual and modeled item metrics, or missing factors in the hypothesized model. The variance value also captures the variance in each of the observed item metrics (e.g., some item metrics are not well explained by the item's features). The modeling process will attempt to maximize the probabilities (colored portions) for the observed item metrics for all items in the comparable item set, by adjusting the common feature weights 650 and common distribution variance 652 for all items.

In some embodiment, the adjustment of the common parameters may occur over multiple iterations, in an iterative process. Thus, if one were to observe the item metric distribution curve 630 for the item as the model's parameters are updated over successive iteration, the curve may be seen to gradually gravitate towards the observed item metric value 640 as its mean, and gradually narrow to focus more around the mean (the hypothesized item metric value). However, the movement of the curve for one item is constrained by the adjustment made to the model to fit the observed item metric values of other items to their respective features. At the end of the day, the probability distributions for each item will be moved as close as possible to their respective observed item metric values, and grow as narrow as possible, to achieve the best fit for all items. At that point, the common distribution parameters may converge to a set of optimal values, which represents the final parameters of the tuned item metrics model. The model may then be used to determine the new item metric for the item whose item metric is to be smoothed.

Figure 7:
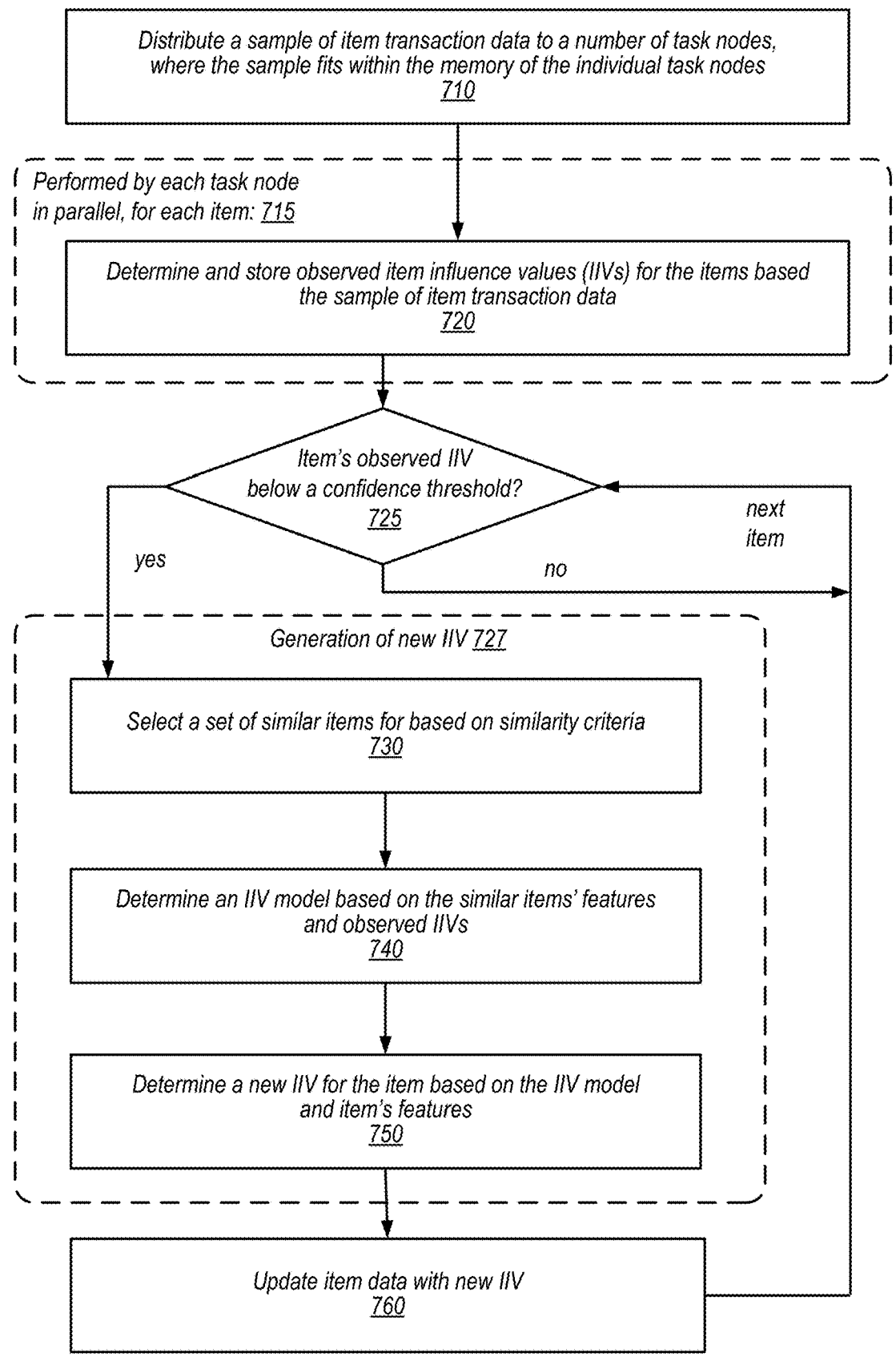
FIG. 7 is a flowchart illustrating a process of determining observed item influence values and then updating the item influence values, according to some embodiments.

FIG. 7 is a flowchart illustrating a process of determining observed item influence values and then updating the item influence values, according to some embodiments. The process shown in FIG. 7 may be performed, for example, by portions of the item transaction service 210 of FIG. 2A, or by components of the system shown in FIGS. 2B and 4.

At operation 710, a sample of item transaction data is distributed to a number of task nodes, where the sample fits within the memory of the individual task nodes. Operation 710 may be performed by, for example, a data preparation subsystem 420 of an item metrics prediction system, as shown in FIG. 4. In some embodiments, the sample of transaction data is selected at least partly in a pseudorandom fashion. In some embodiments, the sample may be sized so that it fits within the memory of each of the task nodes. The sample of transaction data may be used by the task nodes to determine IIVs for each item. For example, the sample transaction data may be used to generate a control data set for each item.

At operation 720, observed item influence values (IIVs) for the items are determined based on the sample of item transaction data. Operation 720 may be performed by for example the IIV generator 220, as discussed in connection with FIG. 2A. In some embodiments, the IIVs may indicate an expected amount of subsequent item transactions by a given user that is caused by an initial item transaction of the respective item by the given user. The observed IIV may be stored as part of the item data 236, as discussed in FIG. 2A. As shown, this operation may be performed in parallel by individual task nodes of a distributed system having a plurality of task nodes. Each task node may be provided a sample of transaction data that fits within their runtime memory, so that the IIV may be determined without generating excessive network communications to and from the task nodes.

At operation 725, a determination is made whether an item's observed IIV is below a confidence threshold. Operation 725 may be performed by for example an IIV confidence evaluator 224, as discussed in connection with FIG. 2A. As shown, this determination may be made for all items, so that those items whose IIV confidence level is below the threshold proceed to the new IIV generation process 727, and those items whose IIV confidence level is above the threshold do not. The item's confidence level may be determined based on one or more statistical metrics associated with the IIV value, such as for example the variance of the IIV, the confidence interval of the IIV, or the sample size used to determine the IIV. In some embodiments, this operation may be skipped, such that new IIVs are determined for all observed IIVs.

At operation 730, a set of similar or comparable items is selected based on one or more similarity criteria, to be used to generate a new IIV for the item. Operation 730 may be performed by for example a similar item selection module 226, as discussed in connection with FIG. 2A. In some embodiments, the similarity criteria may specify that the similar items have one or more common features with the item in question. These common features may include, for example, a common item name, a common item category or subcategory, a common brand name, or a common price or price range. In some embodiments, the similarity criteria reflect a weighted combination of a number of factors or features, which may in some embodiments be implemented as a function to produce a similarity score or indicator for different items. In some embodiments, the set of comparable or similar items may be selected programmatically by a computer, based on a set of rules or a policy. In some embodiments, the set of comparable or similar items may be manually specified by a user or administrator.

At operation 740, an IIV model is determined based on the similar items' features and observed IIVs. Operation 740 may be performed by for example an IIV modeling module 228, as discussed in connection with FIG. 2A. The model may comprise a function that generates a features score from the features of each item. The function may comprise a weighed linear combination of the items' features. The modeling process may use one or more techniques to fit the model to the items' features and observed IIVs. In some embodiments, the fitting may be performed using an iterative method, such as an Expectation Maximization and/or stochastic gradient descent method.

At operation 750, a new IIV is determined based on the IIV model and the features of the item in question (i.e., the item having the low confidence IIV). Operation 750 may be performed by for example one or more modules of the IIV corrector 222, as discussed in connection with FIG. 2A. Because the model is determined using data from multiple other items with large data samples, the confidence of the new IIV determined through this process will be higher than the item's observed IIV.

At operation 760, the item data is updated with the new IIV. Operation 760 may be performed by for example one or more modules of the IIV corrector 222, as discussed in connection with FIG. 2A. The item data may be stored in an item data store 236, as discussed in connection with FIG. 2A.

Figure 8:
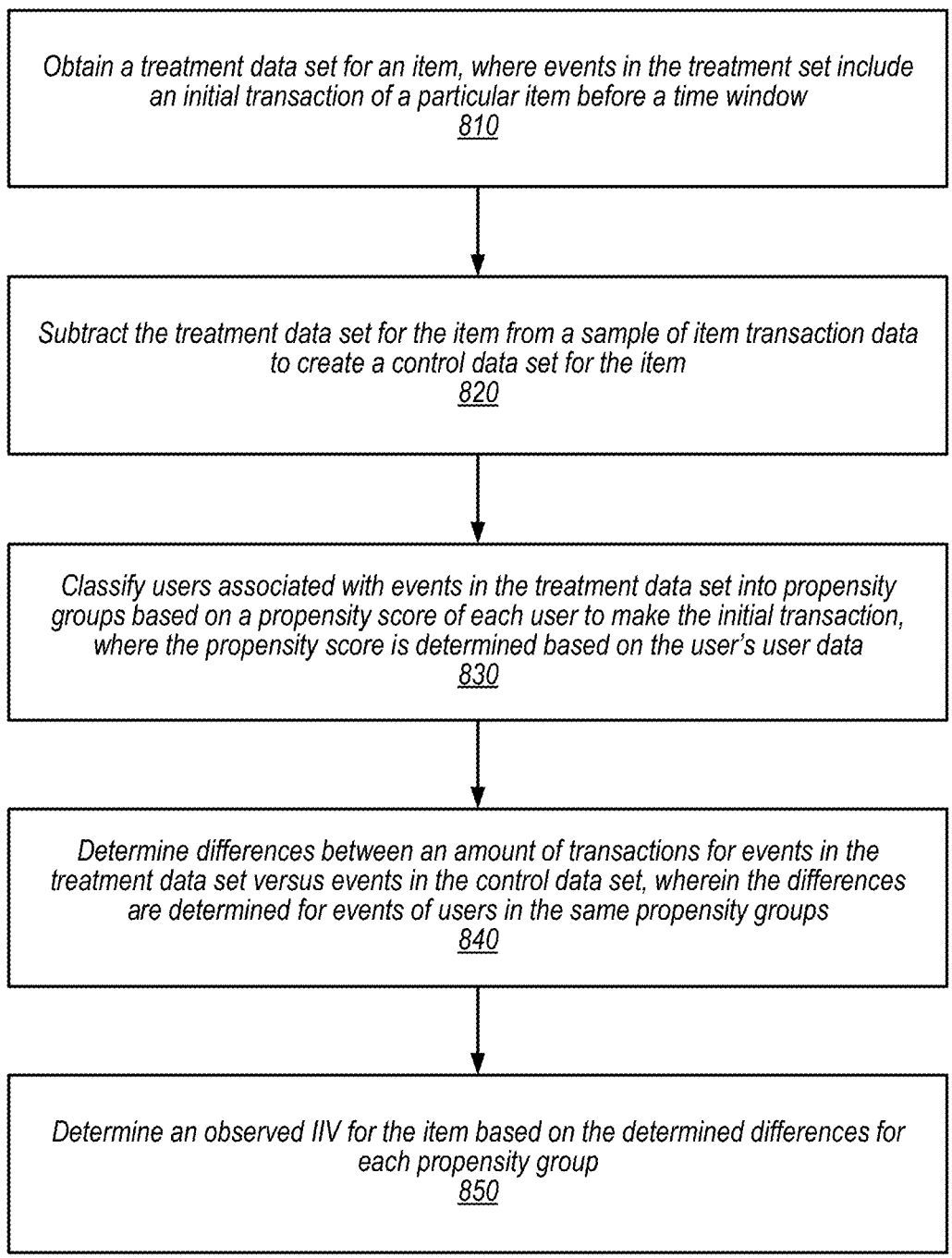
FIG. 8 is a flowchart illustrating a process performed by a task node in determining observed item influence values, according to some embodiments.

FIG. 8 is a flowchart illustrating a process performed by a task node in determining observed item influence values, according to some embodiments. As discussed, the process may be performed in parallel by different task nodes for individual items. The parallelism not only speeds up the IIV determination process for a large number of items, but also allows the process to scale with the number of items.

At operation 810, a treatment data set is obtained for an item. In some embodiments, a global subsystem such as the data preparation subsystem 420 of FIG. 4 may group a set of item transaction data into treatment data for each individual item. Thus, the treatment data set may include events that include an initial transaction of a given item before a time window, followed by a number of follow-on transactions during the time window. In some embodiments, the follow-on transactions may be reduced to an aggregate monetary amount of the follow-on transactions. In some embodiments, the follow-on transactions may be limited to a certain category of items. The treatment data sets may be obtained by an individual task node, to be used to determine the individual IIVs.

At operation 820, the treatment data set for an item is subtracted from the selected transaction data sample to create a control data set for the given item. This operation may be performed by a single task node, using the selected transaction data sample, which was distributed to the task node. In some embodiments, the subtraction may be performed as a set difference operation. After the subtraction, the resulting control data set will not include any events where a user made an initial transaction of the given item (i.e., any treatment data).

At operation 830, user associated with the events in the treatment data set are classified into propensity groups based on a propensity score of each user to make the initial transaction. In some embodiments, the propensity score for each user is determined using the user's attributes that are stored as part of the user data, and based on a propensity model. In some embodiments, the propensity model may be a logistic regression model that is built from the transaction data and the user data. In some embodiments, the propensity model may be built at a time prior to the IIV determination, and updated more slowly. For example, in some embodiments, the IIV for an item may be computed once a week, while the propensity model may be updated once a month. In some embodiments, the treatment data set may be classified into a number of propensity score groups, based on the propensity score of the user associated with the event. In some embodiments, the control data set events may also be scored using the propensity score model, and groups of control events matching the propensity scores of the treatment set groups may be found. Thus, outcome differences may be computed between the treatment data and the control data using events of similar propensity scores.

At operation 840, differences between the outcomes (e.g. an amount of transactions made in the time window) for the events are determined between the treatment data set and the control data set, where the differences are determined between events of the same propensity score groups. As discussed in connection with FIGS. 3B and 3C, these differences represent a per-group IIV that indicates the impact of the item on later transactions, within each of the different groups. The propensity matching technique reduces the bias due to confounding variables, such as a user's predisposition to make the initial transaction.

At operation 850, the observed IIV for the item is determined. The determination may be made based on the determined differences seen in each of the propensity score groups. In some embodiments, where each of the propensity score groups have roughly equal proportions of events, the overall IIV may simply be a straight average of per-group differences. The observed IIV may then be saved as part of the item data in a data store, for example item data store 236 of FIG. 2A. The IIV may be used for a variety of purposes, such as item recommendations, selection of items for advertising, and item inventory planning. After a task node finishes a determination of an observed IIV, the task node may check with an item queue for the next item, and repeat the process for the next item.

Figure 9:
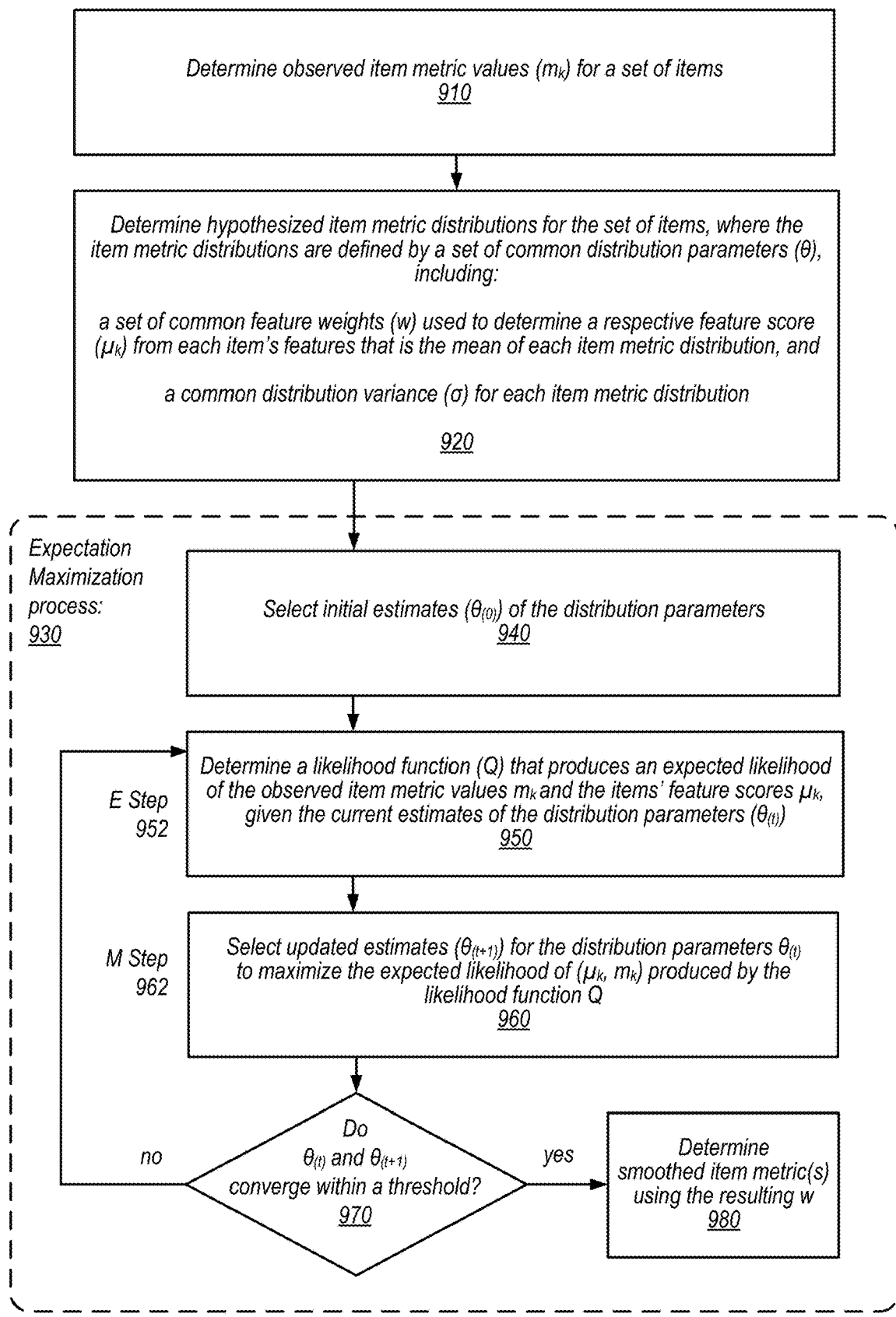
FIG. 9 is a flowchart illustrating an example process to determine a new item metric value for an item, using an Expectation Maximization technique, according to some embodiments.

FIG. 9 is a flowchart illustrating an example process to determine a new item metric value for an item, using an Expectation Maximization technique, according to some embodiments. As may be understood by those skill in the art, the EM technique is one way of finding a set of optimal item metric model parameters. In other embodiments, other techniques may be used. The operations shown in the figure may be performed by, for example, the item metric corrector 254 and/or the item metric modeling module 258, as discussed in connection with FIG. 2B.

At operation 910, an observed item metric values for a set of items is determined. The item metrics may be determined by the item metrics generator module 252 of FIG. 2B, or the item influence prediction system of FIG. 4, as discussed in connection with those figures. In some embodiments, an item metrics corrector, such as the item metrics corrector 254 of FIG. 2B, may be invoked by the item metrics generator module 252 whenever the variance and/or confidence interval of an observed item metric is determined to be unacceptably large. The item metric corrector 254 may then determine a new item metric to reduce the particular item's variance and/or confidence interval based on the observed item metrics and features of a set of comparable items.

At operation 920, hypothesized item metric distributions for the set of items are determined. In some embodiments, a hypothesized item metric model may be constructed to determine a hypothesized value of the item metrics of the set of comparable items, based on the item's features. In some embodiments, the model may use a weighed linear combination of the item's features to determine the hypothesized item metrics, based on a set of feature weights. In some embodiments, the item metric distributions for all the items in the set share a set of common distribution parameters ($\theta$). The set of common distribution parameters may include (1) a set of common feature weights (w) used to determine a respective feature score ($\mu k$) from each item's features that is the mean of each item metric distribution, and (2) a common distribution variance ($\sigma$) for each item metric distribution. The modeling process may then adjust the feature weights w of the item metric model to fit the observed item metric values for the set of comparable items.

Formally, for each observed item metric value $m_k$, the smoothing technique assumes that $m_k \sim N(\mu_k, \sigma_k^2)$ where N is the univariate Gaussian distribution with a given mean and variance as the first and second quantity respectively. A prior is enforced that each $\mu_k$ is drawn from a Gaussian whose mean is a linear combination over item features and weights w and an unknown variance $\sigma^2$, that is, $\mu_k \sim N(z_k^T w, \sigma^2)$ where $z_k$ is the feature vector of an item k. By integrating out $\mu_k$ it may be determined that $m_k \sim N(z_k^T w, \sigma^2 + \sigma_k^2)$.

The smoothing technique defines a matrix $Z \equiv [z_1, z_2, \ldots, z_p]$ with the feature vectors $z_k$ as its columns and $v = Z^T w$ to be the p dimensional column vector with $v_k = z^T w$ as its $k^{th}$ entry. The smoothing technique thus aims to determine the value of parameters v (from w via $Z^T w$) and $\sigma^2$ by maximizing the log-likelihood of observations $m_k$ given the parameters, specifically:

$$S(v, \sigma) = \sum_{k=1}^{p} \log[P(m_k | v_k, \sigma_k, \sigma)] \quad (1)$$

In order to maximize the function in equation (1), in some embodiments, an Expectation Maximization (EM) process 930 that performs repeated iterations of the E and M steps is employed. At operation 940, initial estimates ($\sigma_{(0)}$) of the item metric distribution parameters are selected. These parameters are then adjusted at each iteration of the EM process 930, and is denote $\theta_{(t)}$ at iteration step t.

At operation 950 (or E step 952), the modeling technique determines a likelihood function (Q) that produces an expected likelihood of the observed item influence values $m_k$ and the items' feature scores $\mu_k$, given the current estimates of the distribution parameters ($\theta_{(t)}$).

The posterior distribution of $\mu_k$ is given by $$P(\mu_k | m_k, \sigma_k^2, v_k, \sigma^2) \propto N(m_k | \mu_k, \sigma_k^2) \cdot N(\mu_k | v_k, \sigma^2) = N(\mu_k | \alpha_k, \beta_k^2) \quad (2)$$

where $$\frac{1}{\beta_k^2} = \frac{1}{\sigma_k^2} + \frac{1}{\sigma^2}, \text{ and} \quad (3)$$

$$\alpha_k = \beta_k^2 \cdot \left(\frac{m_k}{\sigma_k^2} + \frac{v_k}{\sigma^2}\right). \tag{4}$$

Let $w_{(t)}$ and $\sigma_{(t)}^2$ be the current estimates of the weight vector and the global variance $\sigma^2$ after t iterations. Also, let $\alpha_{k(t)}$ and $\beta_{k(t)}^2$ be the posteriori estimates for the mean and variance of $\mu_k$ at the end of t iterations defined according to equations (3) and (4) respectively using the values $w_{(t)}$ and $\sigma_{(t)}^2$. In the E step, the smoothing technique computes the expected log-likelihood of complete data $\{(m_k, \mu_k)\}_{k=1}^p$ with respect to the conditional distribution of $\{\mu_k\}_{k=1}^p$ values given the current estimates $w_{(t)}$ and $\sigma_{(t)}$ That is:

$$Q(w, \sigma) = \tag{5}$$

$$\sum_{k=1}^p \int P(\mu_k \mid m_k, \sigma_k^2, z_k^T w_{(t)}, \sigma_{(t)}^2) \log[P(m_k \mid \mu_k, \sigma_k^2) \cdot P(\mu_k \mid z_k^T w, \sigma^2)]$$

$$d\mu_k \simeq -\sum_{k=1}^p \left(\frac{\beta_{k,(t)}^2 + (\alpha_{k,(t)} - z_k^T w)^2}{2\sigma^2} + \log\sigma\right)$$

At operation 960 (or E step 962), updated estimates ($\theta_{(t+1)}$) for the distribution parameters $\theta_{(t)}$ are selected to maximize the expected likelihood of ($\mu_k$, $m_k$) produced by the likelihood function Q. Thus, the expected log-likelihood from the E step is maximized with respect to parameters w and a to obtain the new estimates for them. The maximum of Q with respect to w occurs at $$ZZ^T w = Z\alpha_{(t)} \tag{6}$$

where $\alpha_{(t)}$ is a vector comprising of $\alpha_{k,(t)}$. Likewise, let $\beta_{(t)}$ be a vector with entries $\beta_{k,(t)}$. Decomposing $Z = USV^T$ via singular-value decomposition (SVD) and when the number of features $d \le p$ and Z is full rank, the smoothing technique derives the solution for $v_{(t+1)} = Z^T w_{(t+1)}$ as $$v_{(t+1)} = VV^T \alpha_{(t)}. \tag{7}$$

Likewise, the update for the global variance $\sigma$ equals $$\sigma_{(t+1)}^2 = \frac{1}{p}[\|\beta_{(t)}\|^2 + \|(I - VV^T)\alpha_{(t)}\|^2]. \tag{8}$$

The EM process iterates equations (7) and (8) along with equations (3) and (4) until convergence 970 to obtain the parameter estimates $\hat{v}$ and $\hat{\sigma}^2$ and also the mean $\hat{\alpha}_k$ and variance $\beta_k^2$ for the posterior on $\mu_k$. Convergence in some embodiments may be determined by a specified threshold. For example, if the values of $\theta_{(t)}$ and $\theta_{(t+1)}$ show little change (e.g. fall below the specified threshold) during an iteration, the process may determine that convergence has been achieved. In some embodiments, convergence may require that the difference between $\theta_{(t)}$ and $\theta_{(t+1)}$ stay below the threshold for some number of iterations.

If convergence is achieved at operation 970, the process stops and at operation 980, the new item metric value for the particular item may be determined using the feature weights w determined from the EM process 930. Thus, instead of the originally observed item metric $m_k$, the modeling technique uses the posterior mean $\hat{\alpha}_k$ of the smoothed estimate $\mu_k$, which has a smaller variance.

In some embodiments, when the number of feature dimensions d and the items p are both large, determining the SVD of the Z matrix may be computationally infeasible. Though Z will generally be a sparse matrix, the right singular vectors V may not be and hence cannot be stored in a compact sparse representation. To address this issue, in some embodiments, the smoothing technique may directly solve the linear weight equation (6) using a scalable technique such as stochastic gradient descent (SGD) to determine the updated weights $w_{(t+1)}$, and then determine $v_{(t+1)} = Z^T w_{(t+1)}$.

As may be understood, the energy function S in equation (1) is maximized when $z_k^T w = m_k$, $\forall k$ and $\sigma = 0$. This criterion is met when the feature dimensions exceed the number of items, when there are fewer constraints (p) than the number of variables (d) when Z has p independent rows. Then the posterior estimates from equations (3) and (4) equal $\alpha_k = v_k = m_k$ and $\beta_k = 0$ $\forall k$. This is a classic case of overfitting.

To avoid this result, in some embodiments, the smoothing process may employ a regularization technique. That is, instead of solving for S in equation (1), the smoothing process may solve instead for $$\hat{S}(w, \sigma) = \sum_{k=1}^p \log[P(m_k \mid z_k^T w, \sigma_k, \sigma)] + \frac{\lambda}{2}\|w\|^2 \tag{9}$$

where $\lambda > 0$ is the regularization parameter that is multiplied to the size of the feature weight vector. The resulting regularization term thus reflects and penalizes the complexity level of the model, which in this example is represented by the size of the feature weight vector. With the regularization in place, the expected log-likelihood of complete data $\{(m_k, \mu_k)\}_{k=1}^p$ in the E step equals $\hat{Q}(w, \sigma) = Q(w, \sigma) + \lambda/2\|w\|^2$, which when differentiated with respect to w results in a linear equation $(ZZ^T + \lambda I)w = Z\alpha_{(t)}$. The smoothing process may then use SGD techniques to determine the subsequent updates $w_{(t+1)}$ and $v_{(t+1)}$ and repeat the E and M steps until the convergence criteria is met.

FIG. 10 is a block diagram illustrating an example computer system that can be used to implement one or more portions of an item metric prediction system that determines item metric values using feature smoothing, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a plurality of task nodes having one or more respective hardware processors with associated memory, implementing at least a portion of an item metric prediction system, the item metric prediction system configured to:
   distribute samples of item event data of a plurality of items to the plurality of task nodes, wherein the samples are sized to fit within the associated memory of individual ones of the plurality of task nodes;
   perform, by individual ones of the task nodes, at least partly in parallel:
      determine a respective observed value of an item metric for a respective item of the plurality of items based at least in part on a sample of item event data; and
   recompute a new value of the item metric for an individual item of the plurality of items in response to a determination that a confidence level of the observed value of the item metric is below a confidence threshold, including to:
      select a set of similar items based on one or more similarity criteria;
      train a machine learning model to fit respective observed values of the item metric for individual ones of the similar items to respective features of the individual ones of the similar items; and
      generate the new value of the item metric for the individual item using the machine learning model, wherein the new value has a higher confidence level than the confidence level of the observed value.

2. The system of claim 1, wherein to train the machine learning model, the item metric prediction system is configured to determine parameters of a featured-based model that predicts item metric values, the parameters determined based at least in part on the features of the similar items and the observed values of the item metric of the similar items, using an Expectation Maximization (EM) technique.

3. The system of claim 1, wherein to select the set of similar items based on one or more similarity criteria, the item metric prediction system is configured to select items having one or more common features as the individual item.

4. The system of claim 1, wherein the item metric prediction system is configured to determine the confidence level of the observed value of the item metric based at least in part on a statistical metric of the observed value of the item metric, the statistical metric comprising one or more of: a confidence interval, a variance, and a sample size.

5. The system of claim 1, wherein the observed value of the item metric comprises an observed item influence value (IIV) that indicates an expected amount of subsequent item transactions by a given user that is caused by an initial item transaction of the individual item by the given user, and to determine an observed IIV for the individual item, an individual task node of the plurality of task nodes is configured to:
  obtain a treatment data set for the individual item, wherein events in the treatment data set include an initial transaction of the individual item before a time window;
  subtract a treatment data set from the sample to obtain a control data set, wherein events in the control data set do not include an initial transaction of the individual item before the time window;
  classify users associated with events in the treatment data set into a plurality of propensity groups based on a propensity score of individual users to make the initial transaction, wherein the propensity score is determined based at least in part on the user's user data;
  determine differences between an amount of transactions made in the time window for events in the treatment data set versus events in the control data set, wherein the differences are determined for events of users in the same propensity groups; and
  determine the observed IIV for the individual item based at least in part on the determined differences for the plurality of propensity groups.

6. A computer-implemented method, comprising:
  distributing samples of item event data of a plurality of items to a plurality of task nodes, wherein the samples are sized to fit within a memory of individual ones of the plurality of task nodes;
  performing, by individual ones of the task nodes, at least partly in parallel:
    determining a respective observed value of an item metric for a respective item of the plurality of items based at least in part on a sample of item event data; and
  recompute a new value of the item metric for an individual item of the plurality of items in response to a determination that a confidence level of the observed value of the item metric is below a confidence threshold, including:
    selecting a set of similar items based on one or more similarity criteria;
    training a machine learning model to fit respective observed values of the item metric for individual ones of the similar items to respective features of the individual ones of the similar items; and
    generating the new value of the item metric for the individual item using the machine learning model, wherein the new value has a higher confidence level than the confidence level of the observed value.

7. The computer-implemented method of claim 6, wherein the training of the machine learning model comprises determining a set of parameters of a feature-based model that predicts item metric values, wherein the parameters are determined based at least in part on the features of the similar items and the observed values of the item metric of the similar items, and the parameters are determined using an Expectation Maximization (EM) technique to maximize a likelihood function indicating an expected likelihood of predicted values of the item metric of the similar items given the parameters.

8. The computer-implemented method of claim 7, wherein generating the new value of the item metric for the individual item comprises applying the feature-based model to features of the individual item, wherein the feature-based model comprises a linear weighted combination of the features of the individual item based on a set of feature weights.

9. The computer-implemented method of claim 7, wherein determining the set of parameters comprises iteratively updating the parameters using a stochastic gradient descent technique.

10. The computer-implemented method of claim 7, wherein maximizing the likelihood function comprises maximizing a function that includes a regularization term, wherein the regularization term reflects a complexity level of the feature-based model.

11. The computer-implemented method of claim 6, wherein selecting the set of similar items based on one or more similarity criteria comprises selecting items having one or more common features as the individual item, the common features comprising one or more of: an item name, an item category, a brand name, or a price.

12. The computer-implemented method of claim 6, wherein the confidence level is determined based at least in part on a statistical metric of the observed value of the item metric comprising one or more of: a confidence interval, a variance, and a sample size.

13. The computer-implemented method of claim 6, wherein the observed value of the item metric comprises an observed item influence value (IIV) that indicates an expected amount of subsequent item transactions by a given user that is caused by an initial item transaction of the individual item by the given user, and determining an observed IIV for the individual item comprises:
  subtracting a treatment data set for the individual item from the sample of item event data to create a control data set, such that events in the treatment data set includes an initial transaction of the individual item before a time window, and events in the control data set do not;
  classifying users associated with events in the treatment data set into a plurality of propensity groups based on a propensity score of individual users to make the initial transaction, wherein the propensity score is determined based on the user's user data;
  determining differences between an amount of transactions made in the time window for events in the treatment data set versus events in the control data set, wherein the differences are determined for events of users in the same propensity groups; and determining the observed IIV for the individual item based at least in part on the determined differences for the plurality of propensity groups.

14. The computer-implemented method of claim 13, wherein determining the observed IIV for the individual item comprises:

building a logistic regression model to determine the propensity scores, wherein the logistic regression model is built using the user data of users in the sample of item transaction data.

15. The computer-implemented method of claim 13, further comprising:

determining that a user has conducted a transaction for the individual item; and providing, based at least in part on the new IIV of the individual item, a recommendation for one or more item transactions.

16. A non-transitory computer-accessible storage medium storing program instructions that when executed on one or more processors of an item metric prediction system, cause the item metric prediction system to:

distribute samples of item event data of a plurality of items to a plurality of task nodes, wherein the samples are sized to fit within a memory of individual ones of the plurality of task nodes, and the task nodes are configured to determine at least partly in parallel a respective observed value of an item metric for the plurality of items based at least in part on individual samples of item event data; and recompute a new value of the item metric for an individual item of the plurality of items in response to a determination that a confidence level of the observed value of the item metric is below a confidence threshold, including to:

select a set of similar items based on one or more similarity criteria;

train a machine learning model to fit respective observed values of the item metric for individual ones of the similar items to respective features of the individual ones of the similar items; and generate the new value of the item metric for the individual item using the machine learning model, wherein the new item value has a higher confidence level than the confidence level of the observed value.

17. The non-transitory computer-accessible storage medium of claim 16, wherein to train the machine learning model, the program instructions when executed on the one or more processors cause the item metric prediction system to determine parameters of a feature-based model based at least in part on the features of the similar items and the observed values of the item metric of the similar items, and the parameters are determined using an Expectation Maximization (EM) technique.

18. The non-transitory computer-accessible storage medium of claim 16, wherein to select the set of similar items based on one or more similarity criteria, the program instructions when executed on the one or more processors cause the item metric prediction system to select items having one or more common features as the individual item, the common features comprising one or more of: an item name, an item category, a brand name, or a price.

19. The non-transitory computer-accessible storage medium of claim 18, wherein the program instructions when executed on the one or more processors cause the item metric prediction system to determine the confidence level based at least in part on a statistical metric of the observed value of the item metric comprising one or more of: a confidence interval, a variance, and a sample size.

20. The non-transitory computer-accessible storage medium of claim 17, wherein the new value of the item metric comprises an item influence value (IIV) that indicates an expected amount of subsequent item transactions by a given user that is caused by an initial item transaction of the individual item by the given user, and the program instructions when executed on the one or more processors cause the item metric prediction system to select the individual item for an advertisement based at least in part on the individual item's new IIV.

* * * * *